(12) United States Patent
Delli Santi et al.

(10) Patent No.: US 10,366,127 B2
(45) Date of Patent: *Jul. 30, 2019

(54) DEVICE-SPECIFIC SEARCH RESULTS

(71) Applicant: Samsung Electronics Co., Ltd., Suwon-si, Gyeonggi-do (KR)

(72) Inventors: James Delli Santi, San Jose, CA (US); Eric J. Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 820 days.

This patent is subject to a terminal disclaimer.

(21) Appl. No.: 14/683,916

(22) Filed: Apr. 10, 2015

(65) Prior Publication Data

US 2016/0188730 A1 Jun. 30, 2016

Related U.S. Application Data

(60) Provisional application No. 62/097,501, filed on Dec. 29, 2014.

(51) Int. Cl.
| | | |
|---|---|---|
| *G06F 16/9535* | (2019.01) | |
| *G06F 16/23* | (2019.01) | |
| *G06F 16/951* | (2019.01) | |

(52) U.S. Cl.
CPC ........ *G06F 16/9535* (2019.01); *G06F 16/235* (2019.01); *G06F 16/951* (2019.01)

(58) Field of Classification Search
CPC ......... G06F 17/30864; G06F 17/30554; G06F 17/3089; G06F 17/30365; G06F 17/3053; G06F 17/30867; G06F 3/0482; G06F 3/04842; G06F 3/0481; G06F 3/04847; G06F 16/9535; G06Q 30/00; G06Q 30/0256

USPC ........ 707/728, 709, 722, 749, 750, 999.003; 705/14.64

See application file for complete search history.

(56) References Cited

U.S. PATENT DOCUMENTS

| | | | |
|---|---|---|---|
| 8,925,092 B1 | 12/2014 | Johansson et al. | |
| 9,621,650 B2 * | 4/2017 | Raman | ................ H04L 67/1095 |
| 9,652,508 B1 * | 5/2017 | Imaizumi | ............ G06F 17/3053 |
| 2007/0192307 A1 | 8/2007 | Moulckers et al. | |
| 2011/0029378 A1 * | 2/2011 | Ramer | .............. G06F 17/30867 |
| | | | 705/14.46 |

(Continued)

*Primary Examiner* — Dung K Chau
(74) *Attorney, Agent, or Firm* — Jefferson IP Law, LLP

(57) ABSTRACT

A method includes receiving, by a processing system, a search query and a device type identifier from a user device and identifying, by the processing system, a consideration set of application records based on the search query and the device type identifier. Each application record of the consideration set corresponds to a respective software application and has an initial score associated therewith indicating a degree to which the application record matches the search query. The method also includes determining, by the processing system, a result score of the application record based on the initial score and features corresponding to the application record for each application record. The method further includes generating, by the processing system, device-specific search results based on the consideration set of application records and the result scores thereof and transmitting, by the processing system, the device-specific search results to the user device.

23 Claims, 10 Drawing Sheets

(56) References Cited

U.S. PATENT DOCUMENTS

| | | | |
|---|---|---|---|
| 2012/0284256 A1 | 11/2012 | Mahajan et al. | |
| 2012/0317266 A1 | 12/2012 | Abbott | |
| 2015/0186533 A1* | 7/2015 | Patil | G06F 17/30867 707/723 |
| 2016/0117388 A1* | 4/2016 | Fan | G06F 17/30864 717/178 |
| 2016/0125474 A1* | 5/2016 | Hoffman | G06Q 30/0267 705/14.64 |
| 2017/0168782 A1 | 6/2017 | Boyd | |

* cited by examiner

DEVICE-SPECIFIC SEARCH RESULTS

CROSS REFERENCE TO RELATED APPLICATIONS

This U.S. patent application claims priority under 35 U.S.C. § 119(e) to U.S. Provisional Application 62/097,501, filed on Dec. 29, 2014, which is hereby incorporated by reference in its entirety.

TECHNICAL FIELD

The disclosure generally relates to the field of search, and more particularly to improving relevancy of search results based on a device type or an operating system of a user device.

BACKGROUND

In recent years, use of computers, smartphones, and other Internet-connected devices has grown exponentially. Correspondingly, the number of available software applications for such devices has also grown. Today, many diverse applications may be accessed on any number of different devices, including, but not limited to, smartphones, personal computers, automobiles, and televisions. These diverse applications may range from business driven applications, games, educational applications, news applications, shopping applications, messaging applications, media streaming applications, social networking applications, and so much more. Application developers configure their applications for different operating system types (e.g., the ANDROID® operating system maintained by Google, Inc. or iOS by Apple, Inc.). As the number of available devices and operating systems increases, the features available on those devices increase. Thus, application experiences may be well-received by users on some devices and ill-received by users on other devices because of the device types of the devices.

SUMMARY

One aspect of the disclosure provides a method that includes receiving, by a processing system, a search query and a device type identifier from a user device. The search query includes one or more query terms and the device type identifier is indicative of a device type of the user device. The method further includes identifying, by the processing system, a consideration set of application records based on the search query and the device type identifier. Each application record of the consideration set corresponds to a respective software application and has an initial score associated therewith indicating a degree to which the application record matches the search query. At least one of the application records contains a device-specific review corresponding to the device type of the user device that includes at least one keyword that matches to at least one of the query terms. For each application record, the method includes determining, by the processing system, a result score of the application record based on the initial score and features corresponding to the application record. The method may include generating, by the processing system, device-specific search results based on the consideration set of application records and the result scores thereof. The device-specific search results indicate one or more software applications that are relevant to the search query. Finally, the method may include transmitting, by the processing system, the device-specific search results to the user device.

Implementations of the disclosure may include one or more of the following optional features. In some implementations, the step of identifying the consideration set includes determining one or more tokens with which to query a search index based on the query terms. The search index is keyed by a plurality of keywords, and each keyword is associated with one or more application records that contain the keyword. Each association between the keyword and a particular application record of the one or more application records is tagged with a general tag and/or one or more device-specific tags. The general tag indicates that the keyword is found in a device-independent portion of the application record and each device-specific tag respectively corresponds to a known device type of a plurality of known device types and indicates that the keyword is found in a device-specific portion of the application record corresponding to the known device type. For each token, the method includes querying the search index using the token and the device type identifier. The search index outputs application identifiers associated with the keyword represented by the token and tagged with at least one of a general tag or a device-specific tag corresponding to the device type identifier. The method may include adding the outputted application identifiers in the consideration set. Each outputted application identifier added to the consideration set respectively indicates an application record of the consideration set.

For each application record containing a device-specific portion corresponding to a particular device type, the device-specific portion may be based on one or more device-specific reviews of the software application that indicate the particular device type. For each application record containing the device-specific portion corresponding to the particular device type, the device-specific portions may be obtained from one or more scraped feedback units. Each scraped feedback unit corresponds to the particular device type and includes text that includes the device-specific review. The device-specific reviews of the software application identified in the application record may be determined by: (a) obtaining, by the processing system, one or more documents relating to the software application from one or more data sources, where at least one of the one or more documents includes a plurality of feedback units corresponding to the software application, and the feedback units each include text representing a review of the software application; (b) identifying, by the processing system, a subset of feedback units from the plurality of feedback units that pertain to the particular device type; and (c) for each feedback units in the set of feedback units identifying, by the processing system, the text representing the review of the software application and associating, by the processing system, the text representing the review of the software application with the particular device type in the application record of the software application. In some examples, a device-specific tag corresponds to the particular device type, and when applied to an association between a keyword of the search index and the application record, indicates that the keyword is found in at least one device-specific review corresponding to the particular device type.

The step of identifying the consideration set may include determining one or more tokens based on the query terms of the search query and selecting a device-specific search index from a plurality of device-specific search indexes based on the device type identifier. The device-specific search index corresponds to the device type indicated by the device type identifier and is keyed by a first set of first keywords. Each first keyword is associated with one or more application records that contain the first keyword in a device-specific portion of the one or more applications. The device-specific portions correspond to the device type indicated by the device type identifier. The method includes querying the device-specific search index with each of the one or more tokens. The device-specific search index outputs application identifiers of application records that match one or more of the tokens. The method further includes adding the outputted application identifiers to the consideration set. Each outputted application identifier added to the consideration set respectively indicates an application record of the consideration set. For each application record indexed in the device-specific search index corresponding to the device type indicated by the device type identifier, the device-specific portion is based on one or more device-specific reviews of the software application that indicate the device type. Moreover, for each application record indexed in the device-specific search index, the device-specific portions are obtained from one or more scraped feedback units. Each scraped feedback unit corresponds to the device type and includes text that includes the device-specific review.

In some examples, the device-specific reviews of the software application identified in the application record are determined by: (a) obtaining, by the processing system, one or more documents relating to the software application from one or more data sources, where at least one of the one or more documents includes a plurality of feedback units corresponding to the software application, and the feedback units each include text representing a review of the software application; (b) identifying, by the processing system, a subset of feedback units from the plurality of feedback units that pertain to the device type; and (c) for each feedback units in the set of feedback units identifying, by the processing system, the text representing the review of the software application and associating, by the processing system, the text representing the review of the software application with the particular device type in the application record of the software application.

The step of identifying the consideration set may further include querying a general search index with each of the one or more tokens. The general search index is keyed by a second set of second keywords. Each second keyword is associated with one or more application records that contain the second keyword in a device-independent portion of the application record. The general search index outputs application identifiers of application records that match to one or more of the tokens. The method may further include adding the outputted application identifiers to the consideration set. Each outputted application identifier added to the consideration set respectively indicates an application record of the consideration set.

Another aspect of the disclosure provides a search system that includes a storage system and a processing system. The storage system stores a plurality of application records and a search index keyed by a plurality of keywords. Each application record respectively corresponds to a software application and includes a plurality of attributes of the software application. Each key word is associated with one or more application records that contain the keyword, and each association between the keyword and a particular application record of the one or more application records is tagged with a general tag and/or one or more different device-specific tags. The general tag indicates that the keyword is found in a device-independent portion of the application record and each device-specific tag respectively corresponds to a known device type of a plurality of known device types and indicates that the keyword is found in a device-specific portion of the application record corresponding to the known device type. The processing system includes one or more processors executing computer-readable instructions that when executed by the processing system, cause the processing system to receive a search query and a device type identifier from a user device, and identify a consideration set of application records based on the search query, the device type identifier, and the search index. The search query includes one or more query terms and the device type identifier is indicative of a device type of the user device. Each application record of the consideration set corresponds to a respective software application. The instructions further cause the processing system to determine a result score of the application record based on features corresponding to the application record for each application record, generate device-specific search results based on the consideration set of application records and the result scores thereof, and transmit the device-specific search results to the user device. The device-specific search results indicate one or more software applications that are relevant to the search query.

Implementations of this aspect may include one or more of the following optional features. In some implementations, identifying the consideration set includes determining one or more tokens based on the search query, and for each token, querying the search index using the token and the device type identifier. The search index may output application identifiers associated with the keyword represented by the token and tagged with at least one of a general tag or a device-specific tag corresponding to the device type identifier. The step of identifying the consideration set may further include adding the outputted application identifiers in the consideration set. Each outputted application identifier added to the consideration set may respectively indicate an application record of the consideration set.

For each application record containing a device-specific portion corresponding to a particular device type, the device-specific portion may be based on one or more device-specific reviews of the software application that indicate the particular device type. For each application record containing the device-specific portion corresponding to the particular device type, the device-specific portions may be obtained from one or more scraped feedback units. Each scraped feedback unit corresponds to the particular device type and includes text that includes the device-specific review. The device-specific reviews of the software application identified in the application record may be determined by: (a) obtaining, by the processing system, one or more documents relating to the software application from one or more data sources, where at least one of the one or more documents includes a plurality of feedback units corresponding to the software application, and the feedback units each include text representing a review of the software application; (b) identifying, by the processing system, a subset of feedback units from the plurality of feedback units that pertain to the particular device type; and (c) for each feedback unit in the set of feedback units identifying, by the processing system, the text representing the review of the software application and associating, by the processing system, the text representing the review of the software application with the particular device type in the application record of the software application. In some examples, a device-specific tag corresponds to the particular device type, and when applied to an association between a keyword of the search index and the application record, indicates that the keyword is found in at least one device-specific review corresponding to the particular device type.

Another aspect of the disclosure provides a search system that includes a storage system and a processing system. The storage system stores a plurality of application records. Each application record respectively corresponds to a software application and includes a plurality of attributes of the software application. The storage system further stores a plurality of device-specific search indexes. Each device-specific search index respectively corresponds to a different make and model of a user device and is keyed by a respective set of first keywords. Each first keyword is associated with one or more application records that contain the first keyword in a device-specific portion of the one or more applications. The device-specific portions pertain to the make and model that corresponds to the device-specific search index. The storage system also stores a general search index being keyed by a set of second keywords. Each second keyword is associated with one or more application records that contain the second keyword in a device-independent portion of the application record. The processing system includes one or more processors executing computer-readable instructions. The computer-readable instructions when executed by the processing system cause the processing system to receive a search query and a device type identifier from a user device. The search query includes one or more query terms and the device type identifier is indicative of a make and model of the user device. The instructions further cause the processing system to select a device-specific search index from the plurality of device-specific search indexes based on the device type identifier and identify a consideration set of application records based on the search query, the selected device-specific search index, and the general search index. The instructions also cause the processing system to determine a result score of the application record based on features corresponding to the application record for each application record, generate device-specific search results based on the consideration set of application records and the result scores thereof and transmit the device-specific search results to the user device. The device-specific search results indicate one or more software applications that are relevant to the search query.

Implementations of this aspect may include one or more of the following optional features. In some implementations, for each application record indexed in the selected device-specific search index, the device-specific portion is based on one or more device-specific reviews of the software application that indicate the make and model indicated by the device type identifier. Optionally, for each application record indexed in the selected device-specific search index, the device-specific portions are obtained from one or more scraped feedback units. Each scraped feedback unit may correspond to the make and model indicated by the device identifier and include text that includes the device-specific review. The device-specific reviews of the software application identified in the application record may be determined by: (a) obtaining, by the processing system, one or more documents relating to the software application from one or more data sources, where at least one of the one or more documents includes a plurality of feedback units corresponding to the software application, and the feedback units each include text representing a review of the software application; (b) identifying, by the processing system, a subset of feedback units from the plurality of feedback units that pertain to the particular device type; and (c) for each feedback units in the set of feedback units identifying, by the processing system, the text representing the review of the software application and associating, by the processing system, the text representing the review of the software application with the particular device type in the application record of the software application. In some examples, a device-specific tag corresponds to the particular device type, and when applied to an association between a keyword of the search index and the application record, indicates that the keyword is found in at least one device-specific review corresponding to the particular device type.

In some examples, identifying the consideration set includes determining one or more tokens based on the query terms of the search query and querying the device-specific search index with each of the one or more tokens. The device-specific search index may output application identifiers of application records that match one or more of the tokens and the instructions may cause the processing system to add the outputted application identifiers to the consideration set. Each outputted application identifier added to the consideration set may respectively indicate an application record of the consideration set.

Identifying the consideration set may include querying the general search index with each of the one or more tokens. The general search index may output application identifiers of application records that match to one or more of the tokens. The instructions may cause the processing system to add the outputted application identifiers to the consideration set. Each outputted application identifier added to the consideration set may respectively indicate an application record of the consideration set.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

Like reference symbols in the various drawings indicate like elements.

DETAILED DESCRIPTION

A search system of the present disclosure receives a search query from a user device (e.g., a mobile device) and generates device-specific search results (also referred to as "search results") in response to the received search query.

The search results identify a list of applications that may be ranked based on a variety of different factors (e.g., relevance). The search system transmits the search results to the user device. The user device displays the search results (e.g., a list of applications) to the user so that the user may select one of the applications to preview and/or download. In response to a user selection to download an application, the user device may download the application (e.g., a native application edition of the software application) from a digital distribution platform. As will be discussed in this application, the relevance of an application with respect to a search query depends in part on the device type and/or operating system type of the user device.

Figure 1A:
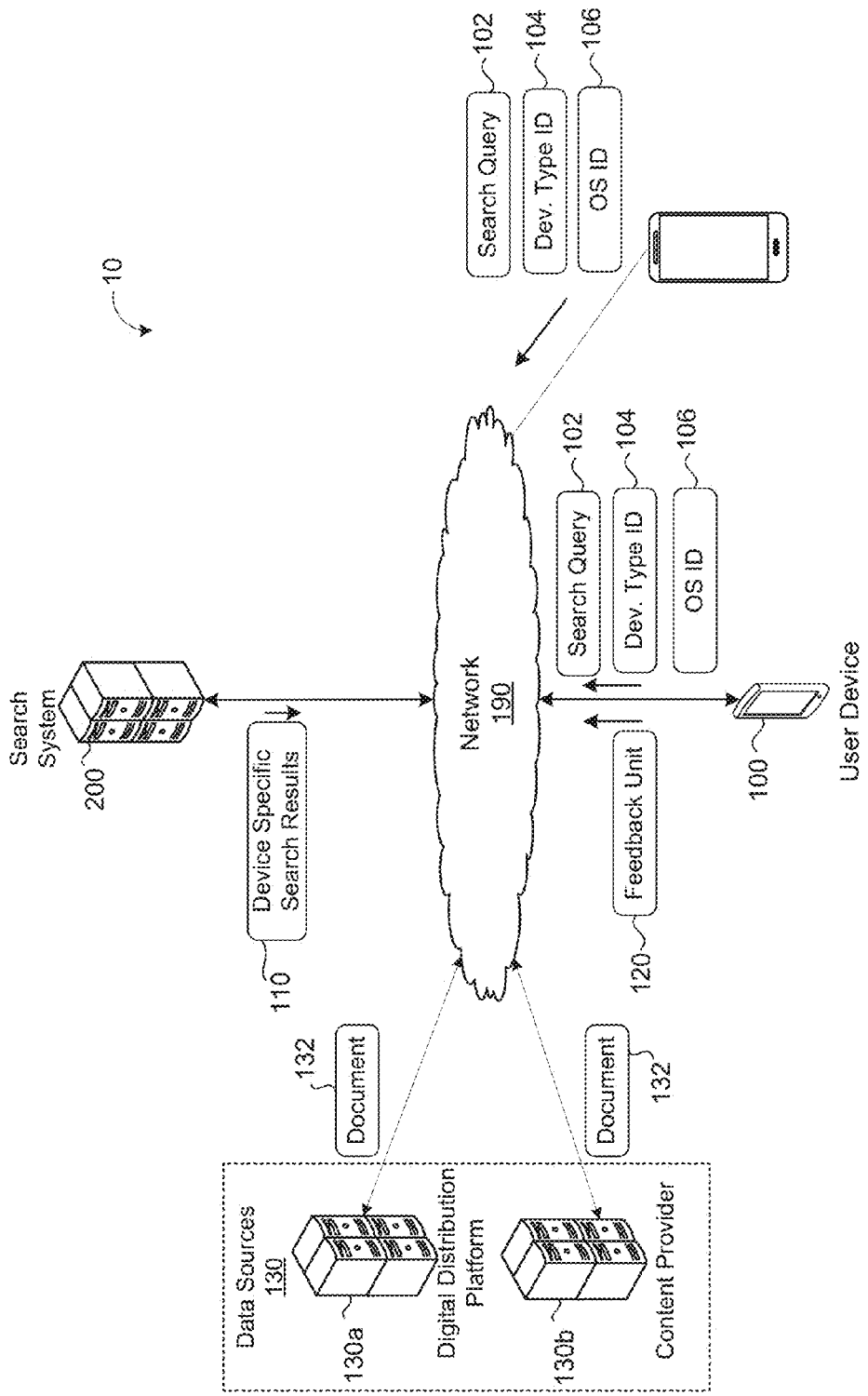
FIG. 1A is a schematic view of an example environment of a search system.

FIG. 1A is a functional block diagram illustrating an example environment 10 of a search system 200. A search system 200 includes one or more computing devices that are configured, either individually or in combination, to receive a search query 102 and return a set of device-specific search results 110 in response to the search query 102. The search system 200 is configured to perform searches for software applications. The search system 200 may be a standalone service or may be part of a larger system. For example, the search system 200 may either link to third party resources (e.g., digital distribution platforms) or may power the search functionalities of an affiliated digital distribution platform. The search system 200 may be configured to perform additional types of searches as well.

A software application may refer to a software product that causes a computing device to perform a function. In some examples, a software application is also be referred to as an "application," "an app," or a "program." Example software applications include, but are not limited to, productivity applications, social media applications, messaging applications, media streaming applications, social networking applications, and games. Software applications may perform a variety of different functions for a user. For example, a restaurant reservation application may make reservations for restaurants. As another example, an internet media player application may stream media (e.g., a song or movie) from the Internet. In some examples, a single software application provides more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. The functions of an application may be accessed using native application editions of the software application and/or web application editions of the software application.

A native application edition (or "native application") is, at least in part, installed on a user device 100. In some scenarios, a native application is installed on a user device 100, but accesses an external resource (e.g., an application server) to obtain data from the external resource. For example, social media applications, weather applications, news applications, and search applications may respectively be accessed by one or more native application editions that execute on various user devices 100. In such examples, a native application may provide data to and/or receive data from the external resource while accessing one or more functions of the software application. In other scenarios, a native application is installed on the user device 100 and does not access any external resources. For example, some gaming applications, calendar applications, media player applications, and document viewing applications may not require a connection to a network to perform a particular function. In these examples, the functionality of the software product is encoded in the native application editions itself. The native application edition is able to access the functions of the software application without communicating with any other external devices. A native application may be pre-installed on a user device 100 or may be downloaded from, for example, a digital distribution platform 130a. The phrase "downloading an application" may refer to downloading a native application edition of the software application to the user device 100 from an external resource (e.g., a digital distribution platform 130a).

Web application editions (also referred to as "web applications") of a software application may be partially executed by a user device 100 (e.g., by a web browser executed by the user device 100) and partially executed by a remote computing device (e.g., a web server or application server). For example, a web application may be an application that is executed, at least in part, by a web server and accessed by a web browser (e.g., a native application) of the user device 100. Example web applications may include, but are not limited to, web-based email, online auctions websites, social-networking websites, travel booking websites, and online retail websites. A web application accesses functions of a software product via a network. Example implementations of web applications include webpages and/or HTML-5 application editions.

As the number of user devices 100 available on the market increases, as well as the number of operating systems, different devices may have different hardware components and/or software features, and different operating systems provide different features and utilize the hardware components in different manners. Application developers need to make decisions regarding their applications, such as how to adapt their software applications to the newest user devices 100 available on the market. Many application developers cater to the newest models. For example, 3D graphics processors for mobile user devices may be a new technology offered only in a small amount of devices. An application developer may develop a software application (e.g., one or more native application editions and/or a web application edition) that displays 3D images. Thus, at the time of the release of an edition of the software application, there may be a small amount of user devices 100 that the application edition is optimized for, and a large amount of user devices 100 that cannot view the 3D images. In an extreme situation, the application edition may not even operate on the large amount of user devices 100 but may run without a problem on the newer user devices 100. In another scenario, one operating system may provide application developers with a fair amount of access to lower levels of the operating system, while another operating system may not afford such access. In this scenario, an edition of the application developed for the first operating system may execute in a much smoother manner (e.g., less glitch or less instances of freezing) than an edition of the application developed for the second operating system. Similarly, if an upgrade to the operating system resolves issues found in previous releases of the operating system, the performance of an application edition may improve when running on the updated version of the operating system. Given these types of scenarios, the user experience of an application may vary greatly depending on the make and model of the user device and/or the operating system of the user device.

Users typically learn about applications in a variety of different manners. One such way is by searching for applications using a search system 200. Additionally or alternatively, users may rely on feedback units 120 corresponding to the application to determine whether to download the application to their user device 100. A feedback unit 120 is user-provided information relating to the software application. A feedback unit 120 may include a textual review by the author and/or a rating by the user. For example, a feedback unit 120 may include a user's thoughts on the application (e.g., "this app worked great" or "I really dislike how this app . . . ") and/or a star rating provided by the user (e.g., 4/5 stars).

Feedback units 120 may be presented to users in a variety of different manners. For example, a digital distribution platform 130a may present feedback units 120 to users on an application download page. A digital distribution platform is an application that allows users to download native applications. Examples of digital distribution platforms include the ITUNES® digital distribution platform provided by APPLE Inc., the GOOGLE PLAY® digital distribution platform provided by Google, Inc., and the AMAZON APP STORE by Amazon, Inc. Users may access a digital distribution platform 130a to download native applications, to view descriptions and screen shots of native applications, and to view feedback units 120 provided by other users. Users may also find information regarding software applications from other resources, such as blogs, websites, and the like. These resources may provide users with an opportunity to provide feedback units 120 regarding applications. When a user accesses one of these resources corresponding to a particular software application, the user device 100 may present one or more of the feedback units 120 pertaining to the software application to the user of the user device 100.

The search system 200 is configured to receive search queries 102 from one or more user device(s) 100 via a network 190. In some implementations, the search system 200 receives the search queries from user devices 100 via a partner device (not shown). A partner device may belong to a company or organization other than that which operates the search system 200 (e.g., internet search providers, wireless communications service providers, or third-party search providers). The partner device may route the search query 102 to the search system on behalf of the user device 100. Thus, in such scenarios, the search system 200 ultimately receives the search query 102 from a user device 100, even when by way of a partner device. The search query 102 may be accompanied with one or more context parameters that provide additional context to the search queries. Context parameters include a device type identifier 104 and/or an operating system identifier 106. The device type identifier 104 may indicate a device type of the user device (e.g., a make and/or model) of the user device 100 providing the search query 102. The operating system identifier 106 may indicate the operating system running on the user device 100. Other types of context parameters may include a geolocation of the user device 100 and/or a list of native applications installed on the user device 100. The search system 200 performs a search for applications in response to a received search query 102 and the context parameters. The search system 200 generates a set of device-specific search results 110 that includes a list of applications that are responsive to the search query 102. The search system 200 utilizes the device type ID 104 and/or the operating system ID 106 to determine the search results 110. In this way, the search results 110 that are provided to the user device 100 depend on the device type of the user device and/or the operating system of the user device 100.

Figure 1B:
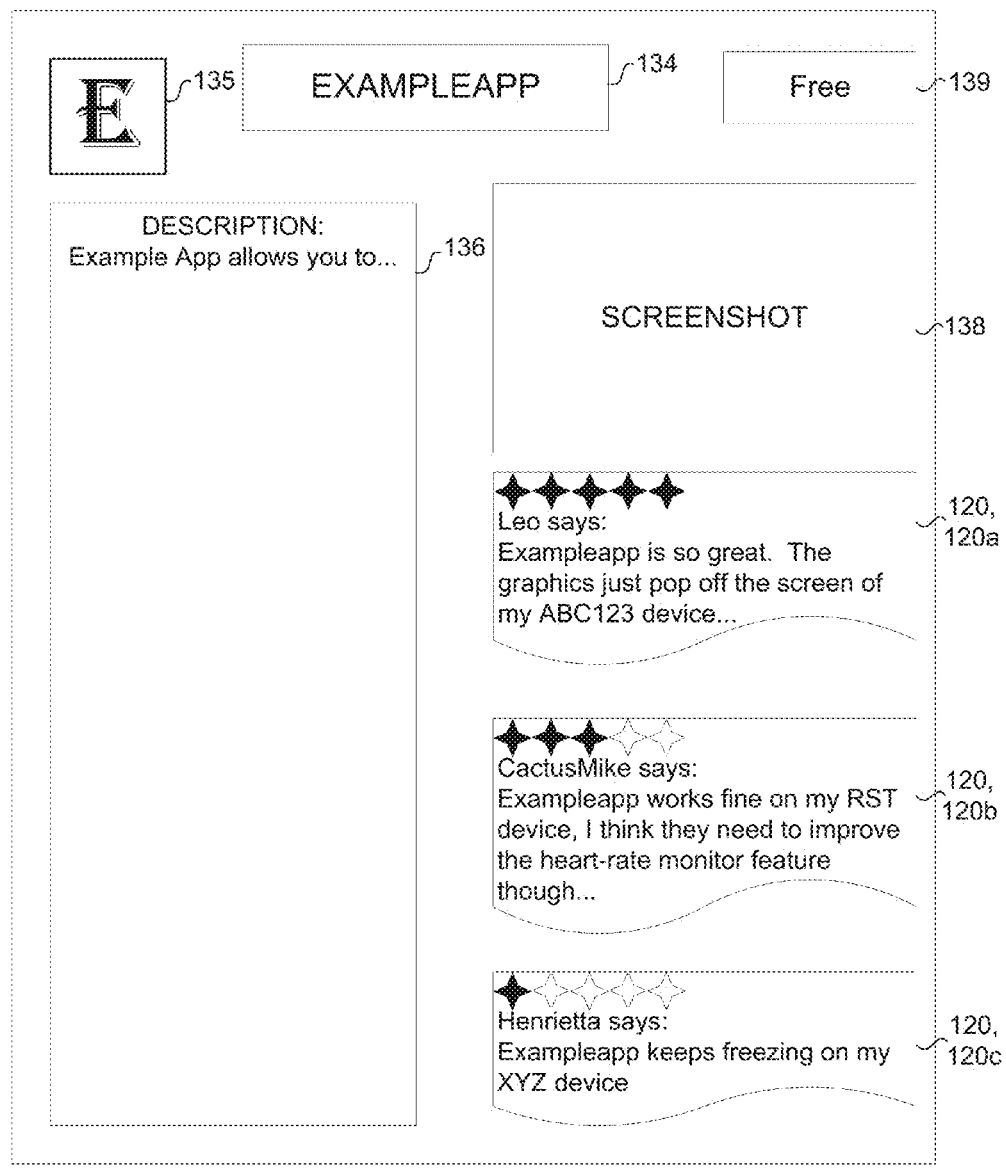
FIG. 1B is a schematic view of an example of a document.

The search system 200 is further configured to collect data from various data sources 130, such as digital distribution platforms 130a and content providers 130b to identify information pertaining to a plurality of different software applications. The search system 200 indexes and organizes this information, such that the information is searchable when the search system 200 receives a search query 102. In operation, the search system 200 obtains documents 132 from the data sources 130. In some examples, a document 132 is a webpage. FIG. 1B illustrates an example of a document 132. In this example, the document 132 is obtained from a digital distribution platform 130a where a user may download an application called "Exampleapp." In some scenarios, the document 132 is an HTML document that is served by the digital distribution platform 130a. In the illustrated example, the document 132 includes a title 134 of the software application (e.g., "EXAMPLEAPP"), an icon 135 of the software application, a description 136 of the software application, a screenshot 138 of the example application, a GUI element 139 that allows the user to download a native application edition of the software application, and three feedback units 120a, 120b, 120c. As shown in the first feedback unit 120a, a first user (e.g., "Leo") gave Exampleapp a rating of five stars and the review included the following text: "The graphics just pop off the screen of my ABC123 device . . . " As shown in the second feedback unit 120b, a second user (e.g., "CactusMike") gave Exampleapp a rating of three stars and the review included the following text "Exampleapp works fine on my RST device, I think they need to improve the heart-rate monitor feature though . . . " As shown in the third feedback unit 120c, a third user (e.g., "Henrietta") gave Exampleapp a rating of one star and the review included the following text: "Exampleapp keeps freezing on my XYZ device." As may be observed from the three feedback units 120a, 120b, 120c, Exampleapp was downloaded to three types of user devices (e.g., ABC123, RST, and XYZ). The overall user experience appears to be correlated to the type of user device 100. The example of FIG. 1B is provided for illustrative purposes. The document 132 may be any format. The depiction of FIG. 1B is a document 132, as rendered and displayed by a user device 100. The document 132, as obtained and analyzed by the search system 200, may be an HTML document, where the various items (title 134, description 136, feedback units 120, icon 135, and/or screenshots 138) are computer readable data contained in tagged fields of the document 132.

The search system 200 scrapes a document 132 to identify information relating to a software application. In the example of FIG. 1B, the search system 200 may scrape the document 132 to identify a title of the software application, the description 136 of the software application, and feedback units 120 pertaining to the software application. The search system 200 updates its search indexes and/or application records 234 corresponding to the software application described in the document 132 based on the information scraped from the document. During the scraping stage, the search system 200 parses and analyzes the feedback units 120 to identify device-specific information or operating system-specific (OS-specific) information. For example, a feedback unit 120 containing a review and a rating of a software application may be specific to a particular device type or operating system. In some implementations, the search system 200 utilizes ratings found in the feedback units 120 to calculate quality scores of a software application. To the extent the feedback unit 120 indicates a device type or operating system type, the search system 200 utilizes the rating found in these feedback units 120 to calculate a device-specific ratings or OS-specific ratings. A device-specific rating indicates a collective quality rating from users of the software application with respect to a particular type of device. An OS-specific score indicates a collective quality rating from users of the software application with respect to a particular operating system (e.g., the type of operating system and/or the version of an operating system).

In some implementations, the search system 200 identifies device-specific or OS-specific feedback units 120 that contain text reviews. The search system 200 may extract the keywords and combinations of keywords contained in these device-specific or OS-specific feedback units 120 and may update search indexes or an application record corresponding to the software application to indicate that those keywords were used in connection with the software application with respect to the device type and/or operating system.

Furthermore, in some implementations, the search system 200 identifies groups of device-specific or operating system-specific feedback units 120 and extracts text snippets that are commonly found. For example, if textual reviews contained in device-specific feedback units 120 for an example software application commonly contain the following text: "3D images look great on my ABC123 device," the search system 200 may extract the foregoing text and attribute the text to ABC123 device. In this way, when a search query 102 transmitted from, for example, an ABC123 device implicates the example application, the extracted snippet may be included in the device-specific search results 110. If the same search query 102 is received from a different type of user device, the snippet does not appear in the device-specific search results 110 transmitted to the different user device 100.

According to implementations of the present disclosure, the search system 200 maintains one or more search indexes that include device ID tags and/or OS ID tags. In this way, a search index may be queried using a keyword (or combination of keywords) and a device type ID 104 or OS ID 106. In these implementations, a search index may output application identifiers (hereafter "application IDs") that are relevant to the query 102 in general or are relevant given the device type ID 104 and/or OS ID 106. For example, a software application having 3D capabilities, "Exampleapp," may have been reviewed by a user of an ABC123 device (e.g., "3D graphics are amazing"). Assuming no other device type offers 3D rendering, there have been no reviews of the application by users of other types of user devices 100 that use the term "3D." Thus, when a search index is queried using the keyword "3D" and a device type ID 104 of the ABC123 device, the search index outputs an application ID of Exampleapp. If another user device 100 of a different type issues a search query 102 with the term "3D," the search index would not output the application ID of Exampleapp, unless the association between the term "3D" and the application record of the software application is tagged with a general tag as well. In this way, the search index outputs application IDs that are relevant to the device type of the user device 100.

In some implementations, the search system 200 maintains one or more general search indexes as well as a plurality of device-specific search indexes and/or OS-specific search indexes. A device-specific search index is a search index that pertains to a particular device type. A device-specific search index is queried when a search query 102 is accompanied by a device type ID 104 that corresponds to the device type of the device-specific search index. A device-specific search index associates keywords or combinations of keywords to application IDs (or application records 234) that contain the keyword when used in connection with the device type. For instance, if a review of a software application pertains to a particular device type (e.g., "heart-rate monitor feature is great on my XYZ device"), the association between the keywords contained in the review is associated with application ID of the software application in the device-specific search index corresponding to the particular device type. In this way, the device-specific and/or OS-specific search indexes may help identify records that are more pertinent to particular device types than other device types, given a particular search query 102. As such, the search results 110 may be referred to as device-specific search results 110.

Furthermore, the search system 200 may include device-specific text snippets and/or OS-specific snippets in an individual search result. Device-specific text snippets and/or OS-specific snippets are segments of text that pertain to a particular device type or OS, respectively. Thus, the search results 110 output by the search system 200 are dependent on the device type and/or operating system of the user device 100 that transmits the search query 102. In this way, the search results 110 may be referred to as device-specific search results 110.

Figure 2A:
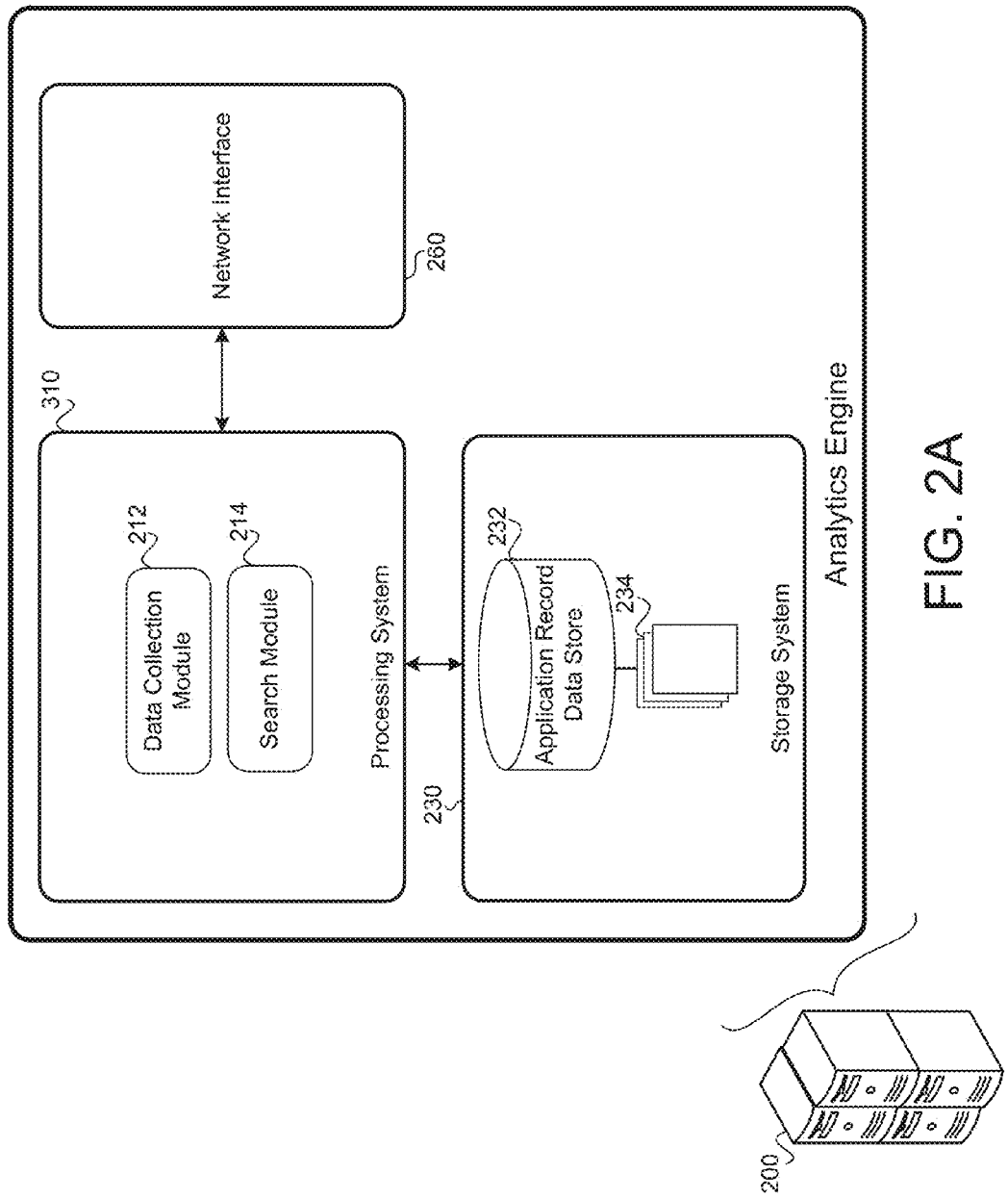
FIG. 2A is a schematic view of example components of a search system.

FIG. 2A illustrates example components of a search system 200. The search system 200 includes a processing system 210, a storage system 230, and a network interface 260. The search system 200 may include other components not shown in FIG. 2A. The components may be interconnected, for example, by a bus and/or any other form or medium of digital data communication, e.g., a communication network.

The processing system 210 is a collection of one or more processors that execute computer-readable instructions. In implementations having two or more processors, the two or more processors may operate in an individual or distributed manner. In these implementations, the processors may be connected via a bus and/or a network. The processors may be located in the same physical device or may be located in different physical devices. The processing system executes a data collection module 212 and a search module 214, which are embodied as computer-readable instructions.

The network interface 260 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 230 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 230 stores an application record data store 232.

The application record data store 232 (hereafter "application data store 232") includes data related to a plurality of different software applications. The data associated with a software application may be referred to herein as an "application record" (e.g., application record 234 of FIG. 2B). Accordingly, the application data store 232 may include a plurality of different application records 234, whereby each application record 234 includes data relating to a different software application. In some implementations, the application data store 232 includes one or more search indexes (e.g., inverted indexes), whereby the application data store 232 may be searched by querying the one or more search indexes. Put another way, the application records 234 stored in the application data store 232 may be searched by way of the search indexes.

Figure 2B:
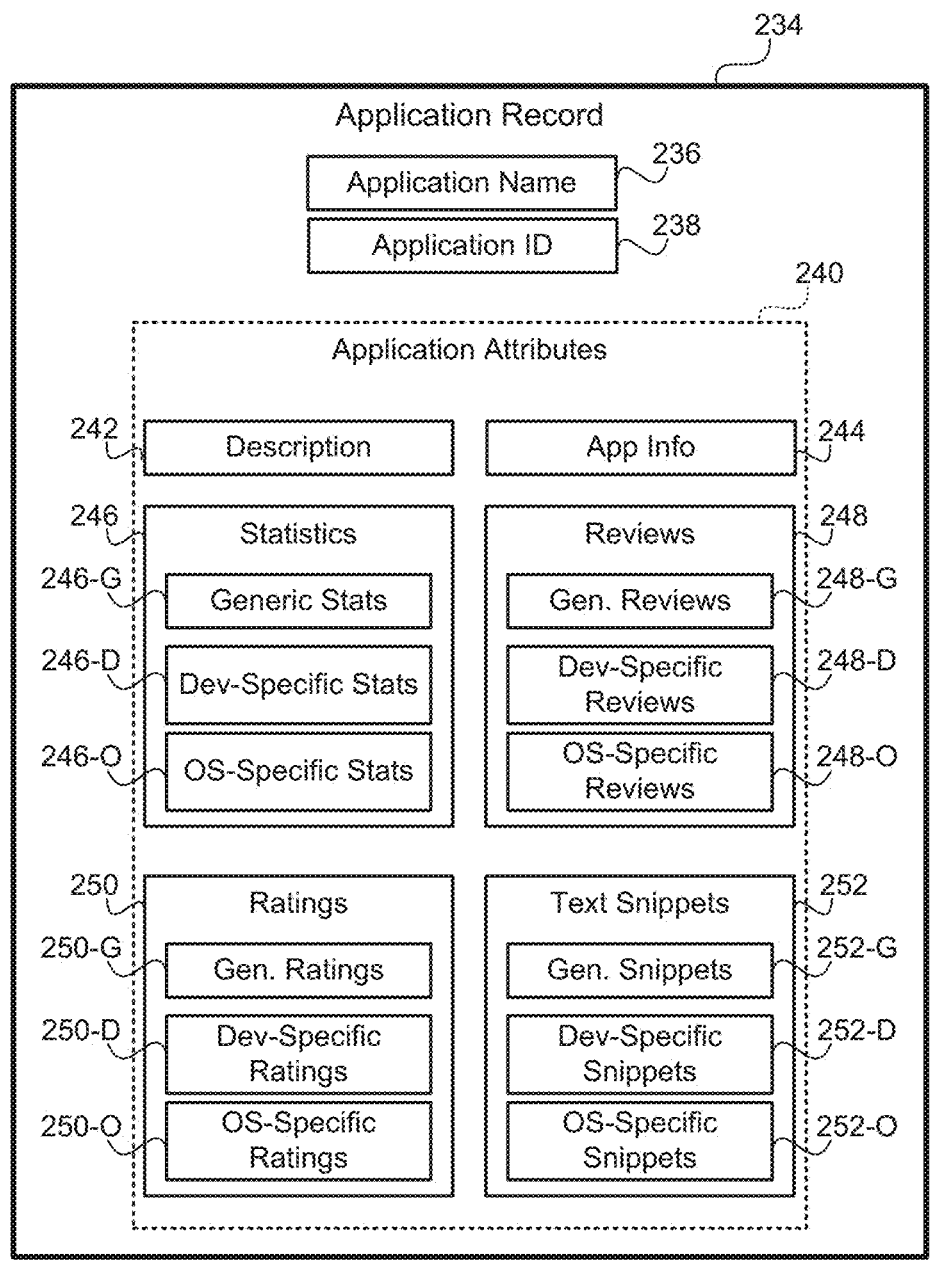
FIG. 2B is a schematic view of an example application record.

Referring now to FIG. 2B, an example application record 234 includes an application name 236, an application identifier 238, and application attributes 240. The application record 234 may generally represent data stored in the application data store 232 that is related to a software application. In some implementations, the application data store 232 stores a plurality of application records 234 having a similar structure as the application record 234 depicted in FIG. 2B.

The application name 236 may be the name of the software application represented by the application record 234. Example application 236 names may include "TWITTER," "SPOTIFY," or "ANGRY BIRDS." The application identifier 238 (hereinafter "application ID 238") uniquely identifies the application record 234 amongst the other application records 234 included in the application data store 232. The application ID 238 may be a string of alphabetic, numeric, and/or symbolic characters (e.g., punctuation marks) that uniquely identify the application record 234 from the other records 234.

The application attributes 240 may include any type of data that may be associated with the software application represented by the application record 234. The application attributes 240 may include a variety of different types of data. The application attributes 240 may include structured, semi-structured, and/or unstructured data. The application attributes 240 may include information that is extracted or inferred from documents 132 retrieved from the data sources 130. As will be discussed, the data collection module 212 obtains documents 132 from the data sources 130, extracts the data from the documents 132, and generates/updates the application records 234 based on the extracted data. In some examples, the application attributes 240 includes data that is manually generated. The application attributes 240 may be updated so that up-to-date search results 110 may be provided in response to a search query 102. For example, the application attributes may include a description 242 of the application, application information 244, statistics 246 pertaining to the software application, reviews 248 pertaining to the software application, ratings 250 of the software application, and text snippets 252 (hereafter "snippets 252") pertaining to the software application.

The description 242 may include a natural language description of the software application. The description 242 may be obtained from one or more data sources 130. For instance, the description 242 may be obtained from digital distribution platforms 130a, from the application developer 130b (e.g., a website describing the software application), or on-line articles and blogs 132b. The application information 244 may include a genre or category of the software application, a name of the developer of the software application, the operating systems on which native application editions of the software application have been configured, whether there is a web application edition of the application, the price of the software application, and any other suitable information pertaining to the software application. The application information 244 may further store one or more download addresses of the software application, assuming a native application edition of the software application exists. The download address may be a URL. The URL indicates an internet address of a digital distribution platform 130a where the user device 100 may download a native application edition of the application. The application information 244 may store multiple download addresses if native application editions of the application may be downloaded from multiple digital distribution platforms 130a.

Application statistics 246 may refer to numerical data related to the application. For example, application statistics 246 may include, but are not limited to, a number of downloads, a download rate (e.g., downloads per month), a number of ratings, and a number of reviews. The application statistics 246 may include general statistics 246-G that pertain to the software application in general (i.e., not tied to a particular device type or operating system). In some implementations, the statistics are device-specific statistics 246-D or OS-specific statistics 246-O, whereby the statistics 246-D or 246-O apply only to a particular device type or operating system. For example, device-specific statistics 246-D may indicate a number of downloads to different types of user devices 100 and the download rates of the software application with respect to the different types of user devices 100. Similarly, OS-specific statistics 246-O may indicate a number of downloads to user devices 100 running different types of operating systems and the download rates of the software application with respect to the different operating systems.

The reviews 248 may refer to textual reviews provided by users (may be also referred to as "user-provided reviews"). The data collection module 212 identifies individual user-provided reviews in feedback units 120. The reviews may be general reviews 248-G. A general review 248-G does not pertain to any particular type of device or operating system. Rather, the general reviews may give a textual review that does not define a known device type or operating system (e.g., "This app has totally improved my efficiency"). The reviews 248 may also include device-specific reviews 248-D and/or OS-specific reviews 248-O. The device-specific reviews 248-D are textual reviews that pertain to a particular device type (e.g., "Exampleapp looks beautiful on my ABC123 Device"). The OS-specific reviews 248-O are textual reviews that pertain to a particular operating system types and/or versions (e.g., "I upgraded my ExampleOS to version 2.1 and now Exampleapp keeps freezing."). If a user-provided review references a specific device type or operating system type or version, then the user-provided review is saved as a device-specific review 248-D or OS-specific review 248-O.

The ratings 250 may refer to collective values provided by users indicating the users' ratings of a software application. The ratings 250 may be average ratings received from multiple users. For example, users may rate a software application between one and five stars or between one and ten points. The various user-provided ratings may be averaged into a rating 250. The ratings 250 may include general ratings 250-G. General ratings 250-G are ratings that do not pertain to any specific type of device or operating system. Put another way, the general ratings 250-G apply to the software application in general, independent of device types or operating system types or versions. The general ratings 250-G may be indicative of all the ratings received from users.

The ratings 250 may further include device-specific ratings 250-D and/or OS-specific ratings 250-O. A device-specific rating 250-D is a rating that is attributed to a particular device type. For example, feedback units 120 may indicate the device type of the user device 100 providing the feedback unit 120 (e.g., in the text or metadata of the feedback unit 120). Thus, the device-specific rating 250-D of a particular type of user device 100 may be a mean or median value of all user-provided ratings extracted from feedback units 120 that are attributed to the particular device type.

An OS-specific rating 250-O is a rating that is attributed to a particular operating system type or a version thereof. For example, feedback units 120 may indicate the operating system version of the user device 100 providing the feedback unit 120 (e.g., in the text or metadata of the feedback unit 120). Thus, the OS-specific rating 250-O of a particular OS type or version may be a mean or median value of all user-provided ratings extracted from feedback units 120 that are attributed to the particular OS type or version.

The device-specific ratings 250-D and the OS-specific ratings 250-O may identify a value (which may also be referred to as a quality score) and the device type or operating system to which the rating pertains. For instance, if an example device type ABC123 smartphone has been rated with the following values: [3, 3, 4], the device-specific rating 250-D may be 3.33 and the device type to which the device-specific rating 250-D pertains is ABC123. Thus, the device-specific rating 250-D may be represented as (ABC123, 3.33). Similarly, if an example OS is OSv1 has been rated with the following values: [2, 3, 4], the OS-specific rating 250-O may be 3 and the OS to which the OS-specific rating 250-O is OSv1. Thus, the OS-specific rating 250-D may be represented as (OSv1, 3).

Snippets 252 are chunks of text that may be attributed to the software application. For example, a snippet of a game may be "this game is addictive" or "graphics are amazing." Snippets 252 may be used to populate search results 110, such that when an individual search result is presented to a user device 100, the individual search result may include the snippet 252. Snippets 252 may include general snippets 252-G. General snippets 252-G do not pertain to any particular type of device or operating system. For example, a general snippet 252-G may be "this app keeps freezing" or "Exampleapp has great voice quality." In these examples there are no references to a specific device type or operating system.

The snippets 252 may further include device-specific snippets 252-D and/or OS-specific snippets 252-O. A device-specific snippet 252-D is a snippet that pertains to a particular type of user device 100. For example, a device-specific snippet pertaining to the ABC123 device type may be "3D graphics look great on my ABC123" or "keeps freezing on my ABC123." An OS-specific snippet 252-O is a snippet that pertains to a particular operating system. For example, an OS-specific snippet 252-O pertaining to OS version 2 ("OSv2.0") may be "I upgraded to OSv2.0 and now it doesn't work." In some implementations, snippets 252 are obtained from feedback units 120 and are included in an application record 234 if specific text is found in a minimum number or percentage of feedback units 120.

An application record 234 may store any additional information. For example, the application record 234 may also include digital media related to the application, such as images (e.g., icons and/or screenshots). In some implementations, the application record 234 stores an memory address where files containing the images are stored. The application attributes may be collected from various data sources 130, such as digital distribution platforms 130a and/or other content providers 130b.

The application record data store 232 may include one or more search indexes 254 (e.g., inverted indexes). In some implementations, the search indexes 254 are keyed by keywords (or tokens) or combinations of keywords (or combinations of tokens), whereby each keyword or combination of keywords identifies the application records 234 that contain the keyword or combination of keywords 256. In this way, the application record data store 232 may be searched by keyword or a combination of keywords (or tokens representing the keyword or combination of keywords). In some implementations, a combination of keywords is an n-gram of keywords (or tokens), whereby the order of the keywords (or tokens) is defined. A search index 254 may be queried using the keyword or combination of keywords and outputs the records 234 that contain the keyword or combination of keywords. The search index 254 may also output an index score indicating a relative importance of the keyword or combination of keywords with respect to the application record 234 (e.g., a term-frequency inverse-document frequency score of the keyword with respect to the record 234). The textual contents of each record 234 may be indexed in the search indexes 254. Put another way, keywords and combinations of keywords that appear in one or more documents 132 on which the application record 234 is based when rendered at a user device 100 may be included in the search index 254. The keywords and combinations of keywords in a search index may be the keywords themselves or tokens representing the keywords.

In some implementations, the one or more search indexes 254 are configured to take the device type or OS type of a user device 100 into account. In some of these implementations, the search indexes 254 include tags applied to each entry in the index. A tag may indicate if the association between a keyword and a record 234 is a general association, a device-specific association, or an OS-specific association. Put another way, a tag may indicate whether the keyword is found in a device-specific portion of the application record 234 (e.g., a device-specific review 248-D), an OS-specific portion of the application record 234 (e.g., a device-specific review 248-O), or a device-independent and OS-independent portion of the application record (e.g., a general review 248-G or a description 242). Furthermore, in the case of a device-specific association or an OS-specific association, the device type or OS type is identified by the tag.

Figure 2C:
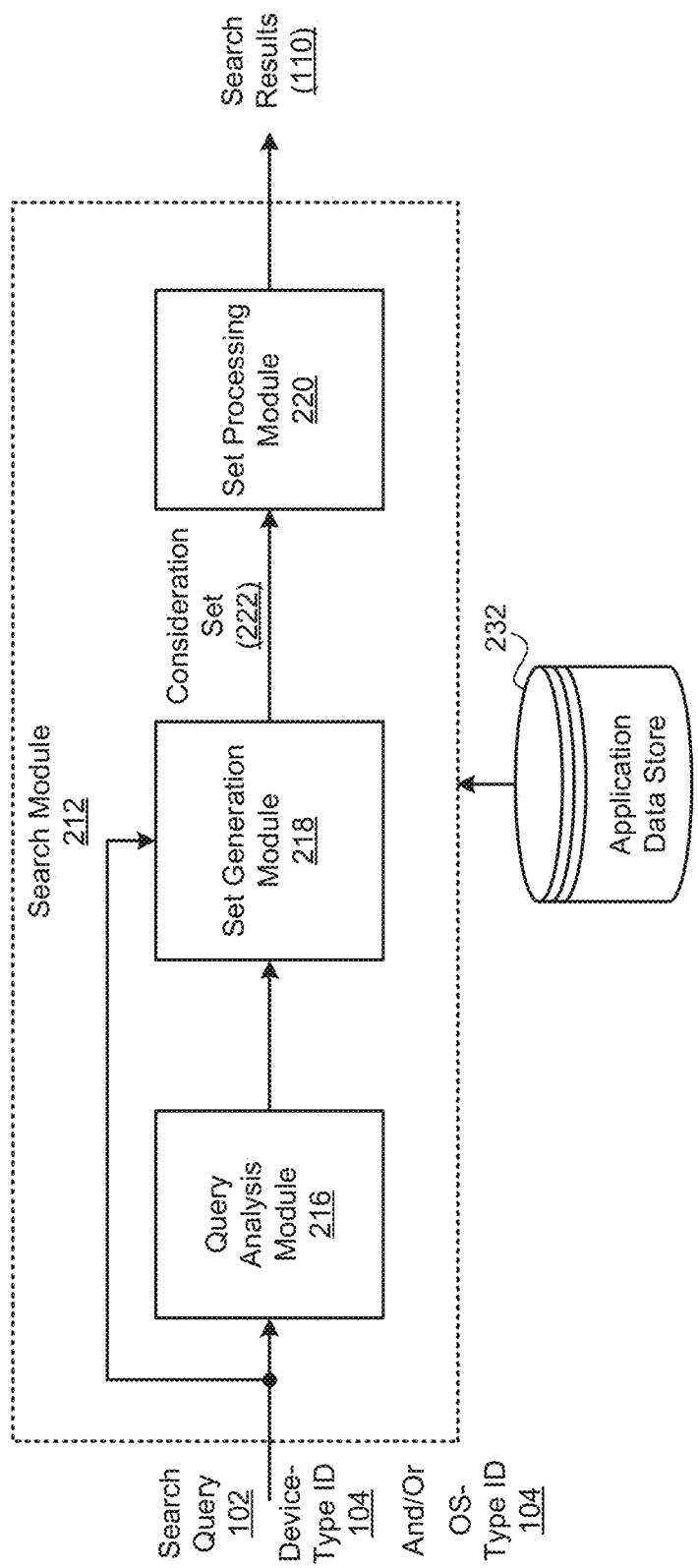
FIG. 2C is a schematic view of an example search module and a data flow thereof.
Figure 2D:
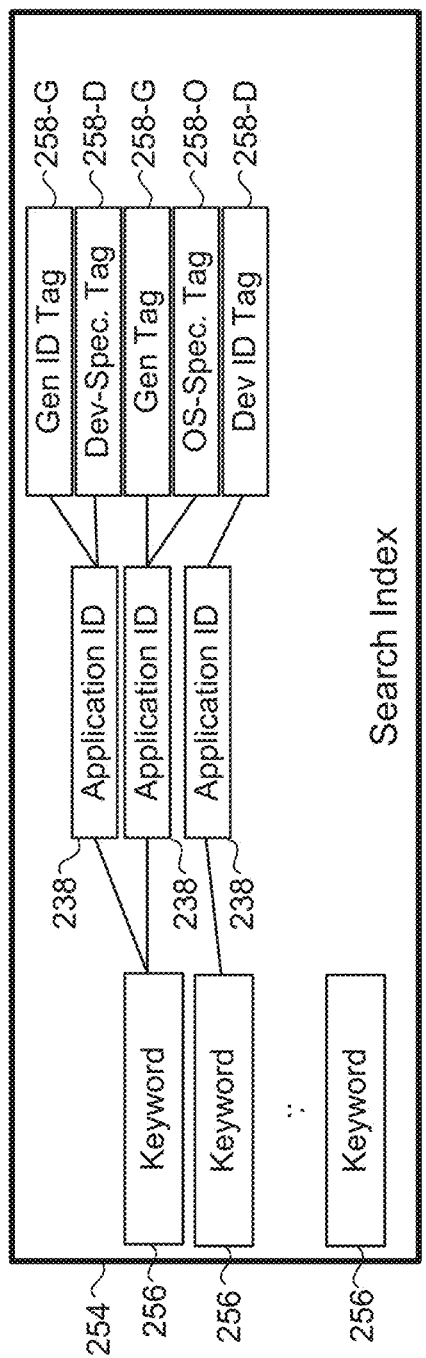
FIG. 2D is a schematic view of an example of a search index with device type tags.

FIG. 2D illustrates an example of a search index 254 having different types of tags 258. In the illustrated example, the search index 254 includes a plurality of keywords 256. Each keyword 256 may be associated with one or more application IDs 238. The associated application ID 238 indicates an application record 234 (not shown). Each application ID 238 may have one or more tags 258 tags associated to it. Non-limiting examples of tags may include a general tag 258-G, a device-specific tag 258-D, and an OS-specific tag 258-O. A general tag 258-G indicates that the keyword (or combination of keywords) in the search index 258-G appears at least once in an application record 234 and pertains to the software application independently of any device type or operating system. A device-specific tag 258-D indicates that the keyword (or combination of keywords) in the search index 254 is used at least once with respect to a specific user device type. The value of the device-specific tag 258-D indicates the specific device type to which the keyword/application record 234 association corresponds. An OS-specific tag 258-O indicates that the keyword in the search index 254 is used at least once with respect to a specific operating system. The value of the device-specific tag 258-O indicates the specific operating system type and/or version to which the keyword/application record 234 association corresponds. In some scenarios, a keyword/application record 234 may include multiple tags 258. For example, a description of a software application may identify a list of features including 3D graphics. Users of two different types of devices may comment on the 3D graphics feature in respective feedback units 120. In this way, the association between the term "3D" and the application record 234 of the software application may be tagged with a general tag 258-G, a first device-specific tag 258-D indicating a first device type, and a third device-specific tag 258-D indicating a second device type. Similarly, if another feedback unit 120 included a review that the 3D functionality of the software application started working after upgrading operating system versions, an OS-specific tag 258-O would be applied to the association between the key term "3D" and the OS-version. Furthermore, each tag that is applied to a keyword/application record 234 association may have an index score attributed thereto, the index score indicating a degree to which the keyword matches the record 234 given the information indicated by the tag. For instance, if the word "3D" is used once in the description but four times in the reviews pertaining to a particular device type, the index score of the "3D"/application record 234 attributed to a general tag may be less than the index score attributed to the device-specific tag. In some implementations, the index score is a TF-IDF score.

Figure 2E:
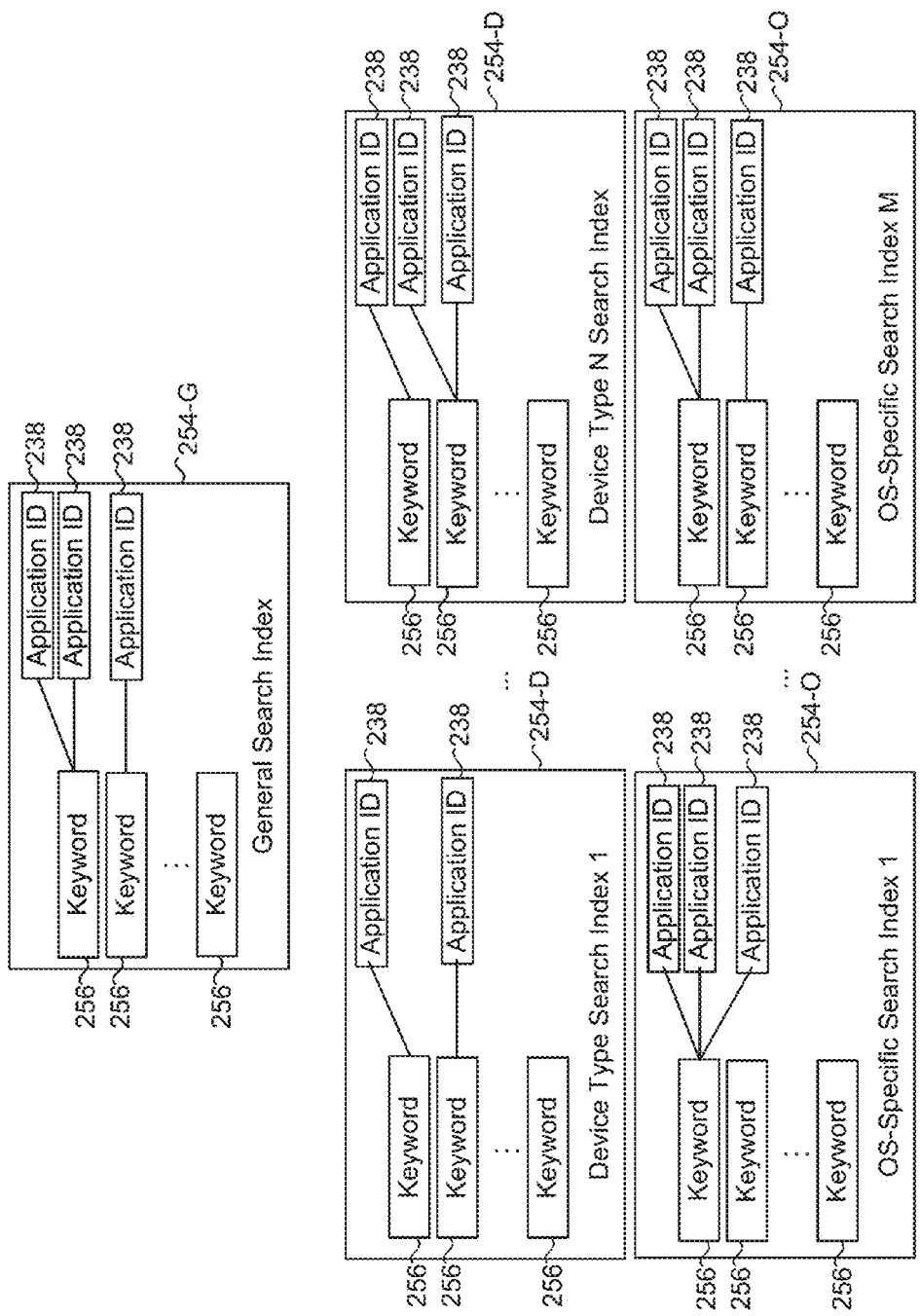
FIG. 2E is a schematic view of a general search index and a plurality of device-specific search indexes.

In some implementations, the search indexes 254 include one or more general search indexes 254-G, a plurality of device-specific search indexes 254-D, and/or a plurality of OS-specific search indexes 254-O. In these implementations, each search index 254 may be an inverted index. FIG. 2E illustrates an example of search indexes. In the illustrated example, the search indexes 254 include a general search index 254-G, a plurality of device-specific search indexes 254-D, and a plurality of OS-specific search indexes 254-O. The general search index(es) 254-G associates keywords 256 with application records 234 that contain the keywords 256 independent of any device types or OS types. For instance, if in an application record 234, the keyword 256 appears in the title, the description, or a text review that is not attributed to a particular device type or OS type, the keyword would be associated to the application record 234 in the general index 254-G. Each device-specific search index 254-D respectively corresponds to a different device-type. If an application ID 238 of an application record 234 is associated with a keyword 256 in the device-specific search index 254-D, then the keyword 256 appears in the application record 234 in relation to the device type indicated by the search index 254-D. For example, if the keyword "3D" is used in the following device-specific review: "the 3D images look great on my ABC123 device;" the term 3D is associated with the application record 234 containing the review in the device-specific search index 254-D corresponding to the ABC123 device type. Similarly, each OS-specific search index 254-O respectively corresponds to a different operating system type or version. If an application ID 238 of an application record 234 is associated with a keyword 256 in an OS-specific search index 254-O, then the keyword 256 appears in the application record 234 in relation to the OS indicated by the OS-specific search index 254-O. For example, if the keyword "3D" is used in the following OS-specific review: "the newest version of Example OS displays 3D images beautifully;" the term "3D" is associated with the application record 234 containing the review in the OS-specific search index 254-O corresponding to the ExampleOS operating system. In some implementations, the keyword 256/application record 234 associations have index scores attributed thereto. The index scores indicate a degree to which the keyword matches the record 234 given the contents of the record 234. If a keyword 256 or combination of keywords 256 is used once in the description (e.g., "gesture control" in the list of features), but three times in reviews of the application with respect to a particular device type, the index score of the association between "gesture control" and a particular application record 234 in a general search index 254-G may be lower than the index score of the association between the keyword combination "gesture control" and the particular application record 234 in the device-specific search index 254-D of the particular device type.

The data collection module 212 obtains documents 132 from various data sources 130 and updates the application data store 232 based on the documents 132. In some implementations, the data collection module 212 employs one or more bots that fetch new or recently changed documents 132 (e.g., webpages). Additionally or alternatively, the bots may collect documents 132 according to one or more different strategies. In operation, the data collection module 212 identifies a data source 130 and crawls the data source 130. The data collection module 212 systematically requests documents 132 from the data source 130. For example, the data collection module 212 may transmit an HTTP request to a digital distribution platform 130a using a URL. The data collection module 212 may be provided a list of URLs that may have been discovered during a previous crawl or obtained from a list of known URLs (e.g., seed URLs). The data collection module 212 then transmits HTTP requests to the digital distribution platform 130a using the list of known URLs. The digital distribution platform 130a returns the requested documents 132. The data collection module 212 may employ a number of different strategies for requesting documents 132, including breadth-first search, depth-first search, a page rank algorithm, or a genetic algorithm.

The data collection module 212 obtains a document 132 from a data source 130 (e.g., a digital distribution platform 130a) and scrapes the document 132. In the event the document 132 is an HTML document, the data collection module 212 may parse and analyze the document 132 to identify various fields. For instance, the data collection module 212 may parse the HTML code of a document 132 for and identify an HTML tag that indicates the application name (e.g., <title id='main-title">), which may be followed by the title of the application. The data collection module 212 may then read in the name of the application from the text following the HTML tag. Similarly, the data collection module 212 may identify an HTML tag in the document 132 that indicates a description of the software application (e.g., <div class="description">), which may be followed by a description of the application. The data collection module 212 may then read in the description of the application from the text following the HTML tag. The data collection module 212 may also search for and identify feedback units 120 in the document 132. The data collection module 212 may search the document 132 for HTML tags that are indicative of a feedback unit 120 (e.g., <div class="user review"> and <div class="star-rating">). The data collection module 212 may then read in the text of the review as well as the user-rating after the identified HTML tags. The data collection module 212 may search for additional HTML tags to ensure that a particular review and a particular rating are from the same user. While the previous example explains parsing an HTML document 132, the data collection module 212 may parse other types of documents as well (e.g., XML documents, JSON documents).

The data collection module 212 updates and/or generates new application records 234 based on the scraped data. For instance, the data collection module 212 may determine whether an application record 234 exists using the name of the software application and/or an application ID 238 corresponding to the software application. If so, the data collection module 212 updates the record 234 with any new information determined during the parsing phase. For instance, if the description of the application has been updated, the data collection module 212 may update the description 242 in the application record 234. If no application record 234 corresponding to the software application exists (e.g., the document 132 relates to a newly discovered software application), the data collection module 212 creates a new record 234 and populates the fields with the information obtained during the parsing phase.

The data collection module 212 further analyzes the information obtained during the crawling/parsing/scraping phase to identify individual feedback units 120. In some scenarios, the feedback units 120 may be tagged with a device type identifier or an OS identifier. For instance, if the search system 200 is configured to receive feedback units 120 directly from users (e.g., the search system 200 is integrated into a digital distribution platform 130*a*), the feedback units 120 may include tags that indicate the device type and OS type of the user device 100 transmitting the feedback unit 120. In such scenarios, the search system 200 may determine the device type and/or OS type to which a feedback unit 120 pertains based on such tags. In most cases, however, feedback units 120 are found in documents 132 obtained from unaffiliated third parties. Thus, it is unlikely that a feedback unit 120 is tagged with this type of information. In such scenarios, the data collection module 212 analyzes the text in a feedback unit 120 to determine whether the text in the feedback unit 120 (e.g., the text in the review) identifies a known device type or operating system. The data collection module 212 may maintain a list of known device types and operating systems (e.g., types and versions of the different types). Furthermore, the list may have abbreviations of the device types or operating systems that users tend to use. In operation, the data collection module 212 parses the feedback unit 120 and identifies the terms found in the text. The terms are then checked against the list of known device types and/or operating systems. If a term is found in the list, the data collection module 212 then attributes the feedback unit 120 to the identified device type and/or operating system. For example, if the text of the review is "this app crashes each time I switch it to classic view. My device is an ABC123," the data collection module 212 may attribute the feedback unit 120 containing the text to the device type "ABC123." Once a feedback unit 120 is attributed to a device type or an operating system, the data collection module 212 may identify device-specific attributes and/or OS-specific attributes of a software application from the feedback unit 120.

In some implementations, the data collection module 212 calculates general ratings 240-G, device-specific ratings 240-D, and/or OS-specific ratings 240-O. As previously discussed, the data collection module 212 identifies feedback units 120 that are associated with device types and/or operating systems. Thus, for each known device type and/or operating system type, the data collection module 212 calculates an average rating of the software application with respect to the known device type or OS type based on the ratings provided in the feedback units 120 pertaining to the known device type or OS type. Put another way, the data collection module 212 may group all the feedback units 120 pertaining to a particular device type or OS type. The data collection module 212 may then determine the ratings from each of the grouped feedback units 120. The data collection module 212 may determine a mean or median rating. This value may be stored in the application record 232 as the device-specific rating 250-D or OS-specific rating 250-O in the application record 234. The data collection module 212 may operate in this manner for each group of feedback units 120.

The data collection module 212 may also calculate the general rating based on all of the feedback units 120 that were collected. In operation, the data collection module 212 may obtain the all of the individual ratings from the feedback units 120, regardless of which device type or operating system that the feedback unit 120 is associated with. The data collection module 212 may then determine a mean or median value of the various ratings. In the event that the data collection module 212 obtains feedback units 120 from more than one data source 130, the data collection module 212 may normalize the ratings from the different data sources 130 so that the ratings are on the same scale. For example, if a first data source 130 receives ratings between 1 and 10 and a second data source 130 receives ratings between 1 and 5, then the data collection module 212 may normalize all of the ratings to a 10 point scale, a five point scale, or any other suitable scale.

In some implementations, the data collection module 212 updates the application records 234 and/or search indexes based on the device-specific attributes and/or OS-specific attributes. As previously mentioned, the data collection module 212 may identify feedback units 120 that pertain to particular device types or OS types. In the event a feedback unit 120 pertains to a particular device type or OS type, the data collection module 212 extracts the text contained in the review portion of the feedback unit 120. The data collection module 212 then tags the text of the review with an identifier of the device type (e.g., a device-type ID) or the OS type (e.g., OS ID 106) and saves the tagged review in the application record 234 of the software application to which the feedback unit 120 corresponds. In this way, the data collection module 212 has stored a device-specific review 250-D or an OS-specific review 250-O in the application record 234 of the software application.

The data collection module 212 updates the search indexes 254 with the keywords or combinations of keywords found in the textual portions of the application records 234. For instance, the data collection module 212 may update the search indexes 254 with keywords or combinations of keywords found in the title 236 of a software application (i.e., application name), the description 242 of the software application, and the reviews 248 of the software application. In doing so, the data collection module 212 updates the search indexes 254 based on device-specific reviews 250-D or OS-specific reviews 250-O.

In some implementations, the data collection module 212 tags associations between a keyword or combination of keywords and a software application in a search index 254 with a tag 258. A keyword or combination of keywords/software application association indicates that the keyword or combination of keywords is found in the application record 234 corresponding to the software application. A keyword or combination of keywords/software application association may be represented by an application ID 238 of the application record 234 of the software application being indexed in the search index 254 in relation to the keyword or combination of keywords. As previously discussed, the tags 258 may be general tags 258-G, device-specific tags 258-D and/or an OS-specific tags 258-O. When updating the search index, the data collection module 212 determines whether a keyword 256 or combination of keywords 256 is found in a device type-independent and OS-independent portion of the record 234 (e.g., the description 242 and/or one or more general reviews 248-G). If so, the data collection module 212 applies a general tag 258-G to the association between the keyword 256 or combination of keywords 256 and the application record 234. Furthermore, if the keyword 256 or combination of keywords 256 is found in one or more device-specific reviews 248-D and/or one or more OS-specific reviews 248-O, the data collection module 212 applies device-specific tags 258-D and/or OS-specific tags 258-O to the association between the keyword 256 or combination of keywords 256 and the application record 234.

For each tag 258 (general, device-specific, and/or OS-specific), the data collection module 212 may calculate the index score for each tag 258. For instance, for a general tag 258-O, the data collection module 212 may calculate the index score (e.g., TF-IDF score) of the keyword 256 or combination of keywords 256 based on the number of instances of the keyword 256 or combination of keywords 256 found in the device-independent and OS-independent portions of the application record 234 (e.g., in the title 236, the description 242, and general reviews 248-G). The data collection module 212 may then attribute the index score to the general tag 258-O. Similarly, for a device-specific tag 258-D corresponding to a particular device type, the data collection module 212 may calculate the index score of the keyword 256 or combination of keywords 256 based on the number of instances of the keyword 256 or combination of keywords 256 contained in any device-specific reviews 248-D corresponding to the particular device type as well as the device-specific and OS-specific independent portions of the application record 234. The data collection module 212 may attribute the index score to the device-specific tag 258-D. The data collection module 212 may calculate the index scores for each device-specific tag 258-D and/or OS-specific tag 258-O applied to the keyword or combination of keywords/application record association.

In other implementations, the data collection module 212 updates a general search index 254-G, one or more device-specific search index 254-D, and/or one or more OS-specific search indexes 254-O based on the keywords and/or combinations of keywords contained in an application record 234. In operation, the data collection module 212 may update a general search index 254-G to indicate the association between a keyword 256 or combination of keywords 256 and the application record 234 when the keyword 256 or combination of keywords 256 is found in a device-type or OS-type independent portion of the application record 234 (e.g., the title 236, description 242, and/or one or more general reviews 248-O). In some of these implementations, the data collection module 212 may create the association between the keyword 256 or combination of keywords and the software application by associating the application ID 238 of the application record 234 of the software application with the keyword 256 or combination of keywords 256 in the general search index 254-G. Furthermore, the data collection module 212 may calculate the index score (e.g., TF-IDF score) of the keyword 256 or combination of keywords 256 based on the number of instances of the keyword or combination of keywords 256 found in the device-independent and OS-independent portions of the application record 234 (e.g., in the title, the description 242, and the general reviews 248-G) and may attribute the index score to the application record 234 in the general search index 254-G. If a keyword or combination of keywords 256 is found in a device-specific review 248-D corresponding to a particular device type, the data collection module 212 may associate the application ID 238 of the application record 234 with the keyword 256 or combination of keywords 256 in the device-specific search index 254-D corresponding to the particular device type. The data collection module 212 may calculate an index score of the keyword 256 or combination of keywords 256 based on the number of instances of the keyword 256 or combination of keywords 256 contained in any device-specific reviews 248-D corresponding to the particular device type, as well as the device-independent and OS-independent portions of the application record 234 (e.g., in the title 236, the description 242, and the general review 248-G). The data collection module 212 may then attribute an index score to the keyword 256 or combination keywords 256/application record 234 association in the device-specific search index 254-D corresponding to the particular device type. The data collection module 212 may calculate the index scores in this manner for each keyword 256 or combination of keywords 256/application record 234 association in each device-specific search index 254-D. The data collection module 212 may update the OS-specific search indexes 254-O in the same manner as device-specific search indexes 254-D. Instead of grouping feedback units 120 according to device type, the data collection module 212 may group feedback units 120 according to OS type and/or version and may update different OS-specific search indexes 254-O based on the keywords 256 or combinations of keywords 256 found in the OS-specific reviews 248-O found in the different groups of feedback units 120.

In some implementations, the data collection module 212 is further configured to identify text snippets 252 pertaining to a software application from the feedback units 120, and to update an application record 234 of the software application with the text snippets 252. The text snippets 252 may be general text snippets 252-G, device-specific snippets 252-D, and/or OS-specific snippets 252-G. The data collection module 212 identifies a set of feedback units 120 corresponding to a software application. The data collection module 212 reads the text reviews contained in the feedback units 120 to identify common chunks of text. In some implementations, the data collection module 212 segments each text review into individual segments (e.g., into sentences or clauses) and compares the individual segments from each text review with the individual segments of the other text reviews. In some implementations, the data collection module 212 utilizes parsing techniques or natural language processing (NLP) techniques to identify the individual segments of a text review 248. When a particular segment is found in a minimum number of reviews (e.g., more than five reviews or more than 5% of the total reviews), the data collection module 212 generates a text snippet 252 based on the segment and stores the snippet 252 in the application record 234 of the software application. For example, if the following segment is found in twenty different reviews: "the 3D images are great!", the data collection module 212 may generate a text snippet based on the common segment. Furthermore, in some implementations, the data collection module 212 synonymizes the segments before doing the comparison, such that similar segments may still be considered common segments. For example, if one review claims "the 3D images are great" and a second review claims "the 3D graphics are great," the data collection module 212 may consider these to be common segments, assuming graphics and images are considered synonyms by the data collection module 212.

The data collection module 212 generates the general text snippets 252-G from a set of all feedback units 120 corresponding to the software application. The data collection module 212 generates the device-specific text snippets 252-D by, for each known device type, grouping a set of feedback units 120 pertaining to the device type and then identifying common text segments from the grouped feedback units 120. Put another way, the data collection module 212 groups the feedback units 120 by device type. To the extent that no feedback units 120 reference a particular device type, the data collection module 212 does not attempt to generate text snippets 252-D for that device type. Otherwise, the data collection module 212 extracts device-specific text snippets 252-D by identifying common text segments among the grouped feedback units 120, and in particular, among the text reviews of the grouped feedback units 120. The data collection module 212 generates the OS-specific text snippets 252-O by, for each grouping a set of feedback units 120 pertaining to a particular operating system or version thereof and then identifying common text segments from the grouped feedback units 120. The data collection module 212 may generate the OS-specific text snippets 252-O in the same manner as the device-specific text snippets 252-D.

The data collection module 212 may generate and update the application record data store 232 in other manners as well. The data collection module 212 may perform additional data acquisition tasks, such that the application records 234 and search indexes 254 contain additional data not explicitly described above.

FIG. 2C illustrates an example search module 214 according to some implementations of the present disclosure. The search module 214 includes a query analysis module 216, a set generation module 218, and a set processing module 220. In operation, the query analysis module 216 receives a search query 102 and additional context parameters (e.g., device type ID 104 and/or OS ID 106) and outputs a set of tokens corresponding to the search query 102. The set generation module 218 receives the tokens and identifies a consideration set 222 of application records 234 (may also be referred to as a "consideration set") based on the tokens and the device type ID 104 and/or the OS ID 106. The consideration set 222 may include actual application records 234 or may contain the application IDs 238 that reference the application records 234. The records 234 indicated in the consideration set 222 represent applications that may be relevant to the search query 102. Furthermore, the records 234 indicated in the consideration set 222 may be selected because one or more of the query terms in the search query 102 were used in connection with a particular device type or operating system. The set processing module 220 receives the consideration set 222 and generates the search results 110 based on the consideration set 222. Furthermore, the set processing module 220 may include device-specific text snippets 252-D and/or OS-specific text snippets 252-O in the search results 110.

The query analysis module 216 receives the query 102. The query analysis module 216 may perform various analysis operations on the received query 102. For example, the query analysis module 216 may perform standard analysis operations, such as tokenization of the search query 102, stemming the search query 102, synonymization of the search query 102, and/or removal of stop words from the search query 102. The query analysis module 216 may perform other analysis operations as well.

The search query 102 may be a query entered by a user on a user device 100. The search query 102 may include text, numbers, and/or symbols (e.g., punctuation) entered into the user device 100 by the user. For example, the user may have entered the search query 102 into a search field (e.g., a search box) of an application running on the user device 100 using a touchscreen keypad, a mechanical keypad, and/or via speech recognition. The user device 100 may transmit context parameters, such as a device type ID 104 and/or an OS ID 106 with the search query 102. The search query 102 and the context parameters may be contained in a query wrapper.

The set generation module 218 identifies a consideration set 222 of application records 234 (the "consideration set") based on the search query 102 and the device-type ID 104 and/or the OS ID 106. The set generation module 218 may identify the consideration set 222 by identifying application records 234 based on matches between terms of the search query 102 and terms in the application records 234. In some implementations, the set generation module 218 utilizes the Apache Lucene software libraries maintained by the Apache Software Foundation. In some implementations, the set generation module 218 queries one or more search indexes 254 with tokens representing the search query 102 and the device type ID 104 and/or OS ID 106 of the user device 100 that transmitted the search query 102. A search index 254 returns application IDs 238 of application records 234 that match at least one of the tokens. In some of these implementations, the application IDs 238 are tagged with one or more tags (e.g., general tags 258-G, device-specific tags 258-D, and/or OS-specific tags 258-O). The search index 254 is queried with a token or a combination of tokens. The search index 254 returns the application IDs 238 that are tagged with a general tag 258-G and that are associated with the token or a combination of the tokens representing the search query 102. The search index 254 also returns application IDs 238 that are tagged with a device-specific tag 258-D corresponding to the received device type ID 104 and that are associated with the token or combination of tokens representing the search query 102. In some implementations, the search index 254 also returns application IDs 238 that are tagged with a OS-specific tag 258-O corresponding to the received OS ID 106 and that are associated with the token or combination of tokens representing the search query 102. For each application ID 238 output by a search index 254, the search index 254 may also output the index score thereof. In the case an application ID 238 is tagged with a general tag 258-G and a device-specific tag 258-D corresponding to the device type ID 104 or an OS-specific tag 258-O corresponding to the OS ID 106, the search index 254 outputs the highest index score.

In other implementations, the set generation module 218 queries a general search index 254-G and a device-specific search index 254-D and/or an OS-specific index 254-O with tokens or combinations of tokens representing the search query 102. The set generation module 218 selects the device-specific search index 254-D to query based on the device type ID 104 received with the search query 102. Put another way, the set generation module 218 queries the device-specific search index 254-D that corresponds to the device type of the user device 100 that transmitted the search query 102. Similarly, in some implementations, the set generation module 218 selects the OS-specific index 254-O to query based on the OS ID 106 received with the search query 102. In other words, the set generation module 218 queries the OS-specific search index 254 that corresponds to the operating system type or version executing on the user device 100 that transmitted the search query 102. Each queried search index 254-G, 254-D, 254-O returns application IDs 238 that are associated with a token or combination of tokens that were used to query the search index 254-G, 254-D, or 254-O. Furthermore, a search index 254-G, 254-D, or 254-O may output an index score for each outputted application ID 238. If a token/application ID 238 association results in multiple index scores (i.e., the token/application ID 238 resides in a general search index 254-G and a device-specific search index 254-D), the set generation module 218 keeps the highest index score.

In some implementations, the set generation module 218 determines an initial score of each returned application record 234 (indicated by an application ID 238 output by a search index 254) based on the index scores output by the search index(es) 254 that are attributed to the application ID 238 of the application record 234. The initial score of an application record 234 indicates the degree to which the application record 234 matches the search query 102. The initial score of an application record 234 may be based on one or more index scores corresponding to the application record 234. For instance if the search query 102 contains the query terms "3D" and "graphics," the search index(es) may output the application ID of an example application record 234 twice if the record 234 contains the keyword "3D" and the keyword "graphics." In such a scenario, the application ID 238 has at least two index scores attributed thereto. Thus, the initial score may be based on the at least two index scores. For instance, the initial score of an application record 234 may be function (e.g., a sum, product, or average) of all the index scores attributed to the application ID 238 of the application record 234. As previously discussed, the consideration set may include actual records 234 or may include the application IDs 238 of the application records 234. The set generation module 218 may output the consideration set 222 to the set processing module 220.

The set processing module 220 performs a variety of different processing operations on the consideration set 222 to generate a set of search results 110. The search results 110 identify one or more applications that are relevant to the search query 102. In some implementations, the set processing module 220 generates a result score for each of the application records 234 identified in the consideration set 222. In these implementations, the set processing module 220 may rank the application records 234 based on the respective result scores assigned to the application records 234 in the consideration set 222. The set processing module 220 may utilize the result scores to determine which application records 234 it may base the search results 110 on and the order in which the search results 110 are presented. In some implementations, the search results 110 include all of the applications identified by the consideration set 222. In other implementations, the search results 110 may be based on a subset of the consideration set 222. For example, the subset may correspond to those applications having the highest result scores.

The information conveyed by the search results 110 may depend on how the result scores are calculated by the set processing module 220. A result score of an application record 234 may indicate a relevance of an application to the search query 102. The result score may take into account a number of signals, including but not limited to, the popularity of an application, the initial score of the application record 234 (e.g., how well the search query matches to the record 234), the general ratings 250-G of an underlying software application, or other properties of the software application. In some implementations, the result score of an application record 234 are further based on the attributes of the search query 102.

The set processing module 220 may determine the result scores of application records in a variety of different ways. A result score may be said to be attributed to the application record 234 or the software application, as an application record 234 defines the properties of a particular software application. In general, the set processing module 220 may generate a result score for an application record 234 based on one or more scoring features. The scoring features may be associated with the application records 234 and/or the search query 102. Scoring features may include application scoring features, query scoring features, and application-query scoring features. An application scoring feature may include any data associated with an application record. For example, application scoring features may include any of the application attributes 240 included in the application record 234 or any additional parameters related to the application, such as data indicating the popularity of an application (e.g., number of downloads) and the general ratings 250-G associated with an application. A query scoring feature may include any data associated with the search query 102. For example, query scoring features may include, but are not limited to, a number of words in the search query 102, the popularity of the search query 102, and the expected frequency of the words in the search query 102. An application-query scoring feature may include any data that may be generated based on data associated with both the application and the search query 102 that resulted in identification of the application record by the set generation module 218. For example, application-query scoring features may include, but are not limited to, the initial score of an application record 234 and how often a search result based on the application record 234 is selected when presented in response to the search query 102. The latter may be derived from feedback data received from user devices 100 when a user selects individual search results 110. The set processing module 220 may determine a result score for an application based on at least one of the application scoring features, the query scoring features, application-user device features, and/or the application-query scoring features.

The set processing module 220 may determine a result score based on one or more of the scoring features listed herein and/or additional scoring features not explicitly listed. In some examples, the set processing module 220 includes one or more machine learned models (e.g., a supervised learning model) configured to receive one or more scoring features. The one or more machine learned models may generate result scores based on at least one of the application scoring features, the query scoring features, and the application-query scoring features. For example, the set processing module 220 may pair the search query 102 with each application and calculate a vector of features for each (query, application) pair. The vector of features may include application scoring features, query scoring features, and application-query scoring features.

The set processing module 220 may then input the vector of features into a machine-learned regression model to calculate a result score that may be used to rank the application in the search results 110 for the search query 102. In some examples, the machine-learned regression model includes a set of decision trees (e.g., gradient boosted decision trees). In another example, the machine-learned regression model may include a logistic probability formula. In some examples, the machine learned task is framed as a semi-supervised learning task, where a minority of the training data is labeled with human curated scores and the rest are used without human labels.

The foregoing is one example manner by which the set processing module 220 may calculate a result score. According to some implementations, the set processing module 220 may calculate result scores in alternate or additional manners. For instance, in some implementations, the set processing module 220 boost the result scores of application records 234 based on the device-specific rating 250-D corresponding to the device type ID 104 and/or the OS-specific rating 250-O corresponding to the OS ID 106. For instance, if the application record 234 contains a device-type rating 250-D corresponding to the device-type ID 104 sent by the user device 100, the set processing module 220 may adjust the result score of the application record 234 based on the device-type rating 250-D when compared to the general rating 250-O. For example, if the device-specific rating 250-D is less than the general rating 250-G, the set processing module 220 may apply a negative boost to the result score of the application record. Similarly, if the device-specific rating 250-D is greater than the general rating 250-G, the set processing module 220 may apply a positive boost to the result score of the application record. In some implementations, the set processing module 220 performs similar boosting based on comparing the device-specific rating 250-D and/or the OS-specific rating 250-O to the general rating 250-G. Such boosting takes into account ratings provided by users of the same device type or operating system. For example, if users of an example application on an example type user device (e.g., ABC123 device type) provide bad reviews (e.g., "3D graphics on my ABC123 device are a joke"), the device-specific rating 250-D may be less than the general rating. Conversely, if users of the example application on another example type of user device (e.g., XYZ device) provide good reviews (e.g., "3D graphics on my XYZ are stunning"), the device-specific rating 250-D corresponding to the XYZ device may be greater than the general rating 250-D. In both scenarios, a search query 102 received from an ABC123 user device 100 or a XYZ user device 100 would return an application record 234 of the example application. By taking into account the difference between the respective device-specific ratings 250-D and the general rating 250-G, the application record 234 would be given a higher result score (e.g., greater relevance) when the search query is received from the XYZ user device 100 than when received from the ABC123 user device 100.

The results scores may be used in a variety of different ways. In some implementations, the result scores are used to rank the application records in a list of results that is presented on a user device 100. In these implementations, a larger result score may indicate that the application is more relevant to a user than an application having a smaller result score. In implementations where the search results 110 are displayed as a list on a user device 100, search results corresponding to applications associated with greater result scores may be listed towards the top of the results list (e.g., near to the top of the screen) and search results corresponding to applications associated with lesser result scores may be listed towards the bottom of the results list and may be accessed by a user scrolling down the screen of the user device 100.

Upon determining which application records 234 to base the search result 110 on, the set processing module 220 generates the search results 110 based on the contents of the selected records 234. As mentioned, the set processing module 220 may select records 234 to include in the search results 110 based on the result scores thereof. For example, the set processing module 220 may rank the application records 234 according to their respective result score and select the records 234 for inclusion in the search results 110 based on the ranking. For example, the set processing module 220 may select the highest ranking records 234 up to a threshold (e.g., 25 records) or may select all records 234 having a score above a threshold. For each selected record 234, the set processing module 220 may generate a result object based on the contents of the application record 234. A result object includes data and/or instructions that a user device 100 utilizes to render an individual search result. In some implementations, the set processing module 220 uses a result object template and populate the template with data contained in the application record 234 (e.g., application name 236, a description, a logo, price(s) to download the native application, etc.). The set processing module 220 further includes a download address of the application in the result object. The download address may be a URL corresponding to a digital distribution platform, whereby the URL indicates a location where a native application edition of the software application may be downloaded. The set processing module 220 may further include a general rating 250-G of the application as well as a device-specific rating 250-D and/or the OS-specific rating 250-O of the application, to the extent such ratings are available. In this way, users may be made aware of how well the application executes on their respective devices, given the device-type and/or the operating system of their user device 100. According to some implementations, the set processing module 220 may include text snippets 252. The set processing module 220 may determine whether there are any device-specific text snippets 252-D and/or OS-specific text snippets 252-O stored in the application record 234. If so, the set processing module 220 inserts one or more device-specific text snippets 252-D and/or OS-specific text snippets 252-O in the result object. Otherwise, the set processing module 220 may insert one or more general text snippets 252-G in the result object, provided there are general text snippets 252-G in the application record 234. In this way, users may see what other users have said about the application, and in particular, users who use the same type of user device 100 and/or the same type of operating system. The set processing module 220 may generate result objects for each application record 234 selected for inclusion in the search results 110. The set processing module 220 may include the generated result objects in a container, such as a hyper-text markup language (HTML) document that may be embedded in another HTML document (e.g., via an iFrame) or a Java script objection notation (JSON) object. The container may be said to contain the search results 110. The set processing module (or a downstream module) may transmit the search results 110 (e.g., the container) to the user device 100 that transmitted the user device 100.

Figure 3:
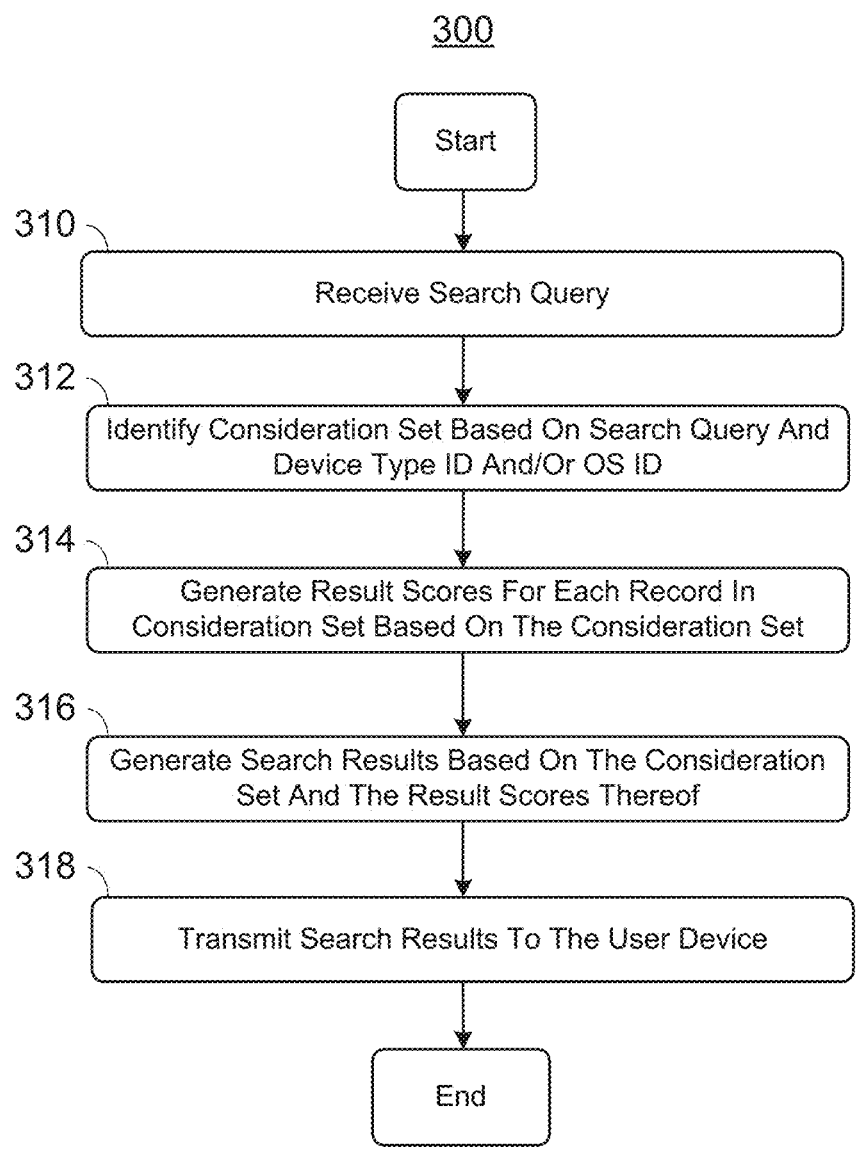
FIG. 3 is a flow chart illustrating an example set of operations of a method for performing an application search.

FIG. 3 shows an example set of operations for a method 300 for performing an application search. For purposes of illustration, the method 300 is explained with respect to the components of the search system 200. The method 300, however, may be executed by any other suitable computing device or combination of computing devices.

At operation 310, the query analysis module 216 receives a search query 102 from a user device 100. The search query 102 may be contained in a query wrapper, which contains context parameters. The context parameters include a device-type ID 104 and/or an OS ID 106. The context parameters may include additional suitable data (e.g., geo-location of the user device and/or applications installed on the user device 100). In some implementations, the query analysis module 216 analyzes the search query 102. For example, the query analysis module 216 may remove stop words from the search query 102, identify synonyms of the query terms contained in the search query 102, stem the query terms, and/or tokenize the search query 102

At operation 312, the set generation module 218 identifies a consideration set 222 of application records 234 based on the search query 102 and the device type ID 104 and/or OS type ID 106. The set generation module 218 queries one or more search indexes 254 with tokens or combinations of tokens that represent the search query 102. A search index returns application IDs 238 of application records 234 that match one or more of the tokens or combinations of query terms.

As previously discussed, in some implementations the search index(es) 254 include tags 258-G, 258-D, 258-O that indicate whether a keyword 256 is found in a device and OS independent portion of the application record 234 (general tags 258-G), in a device-specific portion, such as a device-specific review 248-D (device specific tags 258-D), or in a OS-specific portion, such as a device-specific review 248-O (OS-specific tags 258-D). In these implementations, the set generation module 218 queries the search indexes 254 using a token or combination of tokens and the device type ID 104 and/or the OS ID 106. A search index 254, in response to a token or combination of tokens and a device type ID 104, returns an application ID 238 of an application record 234 if i) the application ID 238 is associated to the keyword or combinations of keywords that correspond to the token or combination of tokens used to query the search index; and ii) the keyword 256/application ID 238 association is tagged with a general tag 258-G, a device-specific tag 258-D corresponding to the device type ID 104, and/or an OS-specific tag 258-O corresponding to the OS ID 106. In some implementations, the search index outputs an index score (e.g., TF-IDF score) for each application ID 238 it outputs. In the case that a keyword/application ID 238 association has more than one index score attributed thereto (e.g., the application ID 238 is tagged with a general tag 258-G and a device-specific tag 258-D), the set generation module 218 may set the index score of the association to the highest value output by the search index 254. The set generation module 218 includes the application IDs 238 returned by the one or more search indexes 254 or the records 234 corresponding to the returned application IDs 238 in the consideration set 222. In some implementations, the set generation module 218 calculates an initial score for each application record 234 that is indicated in the consideration set 222 based on the index scores attributed to the application record. In these implementations, the set generation module 218 may associate each initial score with the corresponding application ID 238 or application record 234 in the consideration set 222.

In some implementations, the search indexes 254 include one or more general search indexes 254-G, as well as, a plurality of device-specific search indexes 254-D, and/or a plurality of OS-specific search indexes 254-O. In these implementations, the set generation module 218 the queries the one or more general search indexes 254-G with tokens or combinations of tokens. For each token or combination of tokens used to query a general search index 254-G, the general search index 254-G returns application IDs 238 of application records 234 that contain the keyword or combination of keywords corresponding to the token or combination of tokens. For each output application ID 238, the search index 254 may further output an index score corresponding to the keyword 256 or combination of keywords 256/application ID 238 association. The one or more general search indexes 254-G may output an application ID 238 more than once if the application record 234 contains one or more of the keywords or combinations of keywords used to query the general search index 254-G. For example, if the application description 242 in a particular application record 234 contains the term "3D" and "game" and the search query 102 contains the query terms "3D" and "games," the one or more general search indexes 254-G output the application ID 238 at least twice because of the association of the term "3D" with the particular application record 234 and the association of the term "game" with the particular application record 234. In this example, each keyword 256 or combination of keywords/application record 234 association has a corresponding index score.

In these implementations, the set generation module 218 also identifies a device-specific search index 254-D to query based on the device type ID 104 received with the search query 102 and/or an OS-specific search index 254-O to query based on the OS ID 106 received with the search query 102. The set generation module 218 then queries the identified device-specific search index 254-D and/or the identified OS-specific search index 254-O with the tokens or combinations of tokens, in the manner described with respect the one or more general search indexes 254-G. The device-specific search index 254-D outputs application IDs 238 of application records 234 that contain a keyword or combination of keywords used to query the device-specific search index 254-D in a device-specific portion of the record 234 corresponding to the device type of the user device 100 that transmitted the search query 102. For example, if the application record 234 contains a device-specific review 248-D corresponding to the device type of the user device 100 that transmitted the search query 102 and one or more of those reviews contains one or more of the query terms contained in the search query, the device-specific search index 254-D outputs the application ID 238 of the application record 234. Similarly, in some implementations, an identified OS-specific index 254-O are queried with the tokens or combination of tokens. The OS-specific index 254-O outputs application IDs 238 of application records 234 that contain keywords or combinations of keywords that match the tokens or combinations of tokens used to query the OS-specific index 254-O in an OS-specific portion of the application record 234. For each application ID 238 output by the OS-specific search index 254-O, the OS-specific search index 254-O may further output the index score of the keyword 256 or combination of keywords 256/application ID 238 association. As discussed with respect to the general search indexes 254-G, the query terms of a search query 102 may implicate an application record 234 indexed in the device-specific search index 254-D or an OS-specific search index 254-O more than once. In such scenarios, each keyword/application ID 238 association may have a respective index score associated therewith. Furthermore, if a particular keyword 256 or combination of keyword 256/application ID 238 has multiple index scores associated therewith, the set processing module 220 may set the index score of the association equal to the greatest index scores. For example, if an application record 234 contains the ordered combination of keywords "gesture control" in the application description 242 as well as in a pertinent device-specific review 248-D, then both a general search index 254-G and a device-specific search index 254-D output the application ID 238 of the application record 234 due to the association between the combination of keywords "gesture control" and the application ID 238 in the respective indexes. Each association may have a different index score associated therewith, however. Thus, in such a scenario the set generation module 218 may set the index score of the association to the higher of the two index scores (e.g., the index score output by the device-specific search index 254-D).

The set generation module 218 may include the application IDs 238 (or the actual records 234 indicated by the application IDs 238) output by the one or more general search indexes 254-G, the identified device-specific search index 254-D, and/or the OS-specific search index 254-O in the consideration set. Furthermore, in some implementations, the set generation module 218 calculates an initial score for each application record 234 that is indicated in the consideration set 222 based on the index scores attributed to the application record 234. In these implementations, the set generation module 218 may associate each initial score with the corresponding application ID 238 or application record 234 in the consideration set 222.

At operation 314, the set processing module 220 generates result scores for the application records 234 indicated by the consideration set 222. For each application record 234, the set processing module 220 identifies scoring features corresponding to the application record 234. As previously discussed, the set generation module 218 may identify application scoring features, query scoring features, and application-query scoring features. In some implementations, the set generation module 218 generates a feature vector containing one or more scoring features. For each application record 234 in the consideration set 222, the set processing module 220 inputs the scoring features (e.g., the feature vector) corresponding to the application record 234 in a machine-learned scoring model. The machine-learned scoring model outputs a result score for the inputted feature vector. Furthermore, in some implementations, the set processing module 220 boosts the result score of an application record 234 based on the device-specific rating 250-D corresponding to the device type ID 104 and/or an OS-specific rating 250-O corresponding to the OS ID 106 when viewed in relation to the general rating 250-G of the software application. For example, the set processing module 220 may negatively boost the result score if the relevant device-specific rating 250-D contained in the application record 234 is less than the general rating 250-G and may positively boost the result score if the relevant device-specific rating 250-D is greater than the general rating 250-G.

At operation 316, the set processing module 220 generates the search results based on the consideration set 222 and the result scores thereof. As was discussed, the set processing module 220 may rank the application records 234 according to their respective result scores and/or select application records 234 to include in the search results 110 based on their respective result scores. For each of the application records 234 to be included in the search results 110, the set processing module 220 generates a result object for each of the application records 234. The set processing module 220 populates the result object with data contained or pointed to by application record 234. In some examples, the set processing module 220 obtains an application name, a description of the application, an icon of the application, and a download address of the application from the application record 234 and populates the result object with this data. The set processing module 220 may also obtain a device-specific rating 250-D and/or an OS-specific rating 250-O from the application record 234 based on the received context parameters and inserts the rating(s) in the result object. Further, in some implementations the set processing module 220 determines whether there are any device-specific snippets or OS-specific snippets that correspond to the device type or OS of the user device 100 that provided the search query 102. If so, the set processing module 220 inserts the device-specific snippets and/or OS-specific snippets in the result object. The set processing module 220 generates result objects corresponding to each of the application records 234 that are to be included in the search results 110. The set processing module 220 may insert the result objects into a container, whereby the container contains the search results 110. At operation 318, the set processing module 220 transmits the search results 110 to the user device 100 that provided the search query 102.

The method 300 of FIG. 3 is provided for example only. Variations of the method are contemplated and are within the scope of the disclosure.

While reference is made to downloading native application editions of a software application, the search system 200 may be configured to include uniform resource locators (URLs) where a web application edition of a software application may be accessed. For instance, if a software application includes an HTML-5 application edition (e.g., an "HTML-5 app"), the HTML-5 web application may be accessed via the URL. Thus, in some implementations the search results 110 include URLs that link to HTML-5 application in addition to or in place of a download addresses that link to a digital distribution platform where a native application edition may be downloaded.

Figure 4:
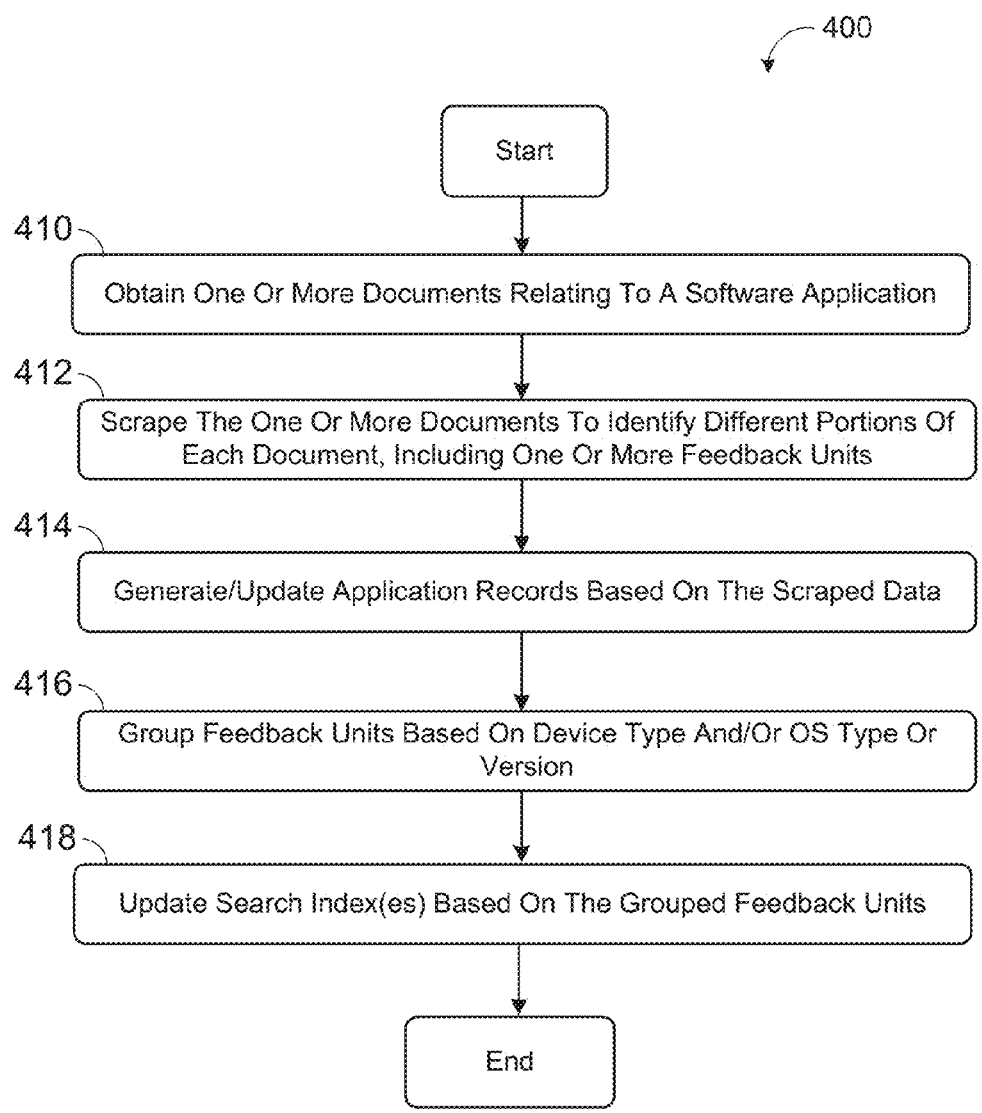
FIG. 4 is a flow chart illustrating an example set of operations of a method for updating one or more search indexes.

FIG. 4 illustrates a set of operations of a method 400 for updating one or more search indexes 254 based on feedback units 120 contained in one or more documents 132. For purposes of explanation, the method 400 is described with respect to the data collection module 212 (FIG. 2A). The method 400 may be performed by other suitable components.

At operation 410, the data collection module 212 obtains one or documents 132 relating to the software application from one or more data sources 130. For instance, the data collection module 212 may request documents 132 from one or more digital distribution platforms 130a that distribute native application editions of the software application. Additionally or alternatively, the data collection module 212 may request documents 132 from content providers 130b, such as blog websites or new websites that review software applications. In these implementations, the data collection module 212 may identify documents 132 that are pertinent to the software application and may request those documents 132 from the content provider 130b. In some implementations, the data collection module 212 collects documents 132 from a data source 130 by crawling the data source 130 and identifies documents 132 that are pertinent to the software application from the collected documents 132. In these implementations, the data collection module 212 may begin with one or more seed URLs, which the data collection module 212 uses to begin the crawl of the data source 130. As the data collection module 212 crawls the data source 130, the data collection module 212 identifies new documents 132 to request from the data source 130 based on information (e.g., links) contained in the obtained documents 132. As the data collection module 212 collects the documents 132, the data collection module 212 may determine the software application to which the document corresponds. For example, the metadata of the document 132 or the title of the document may identify the software application.

At operation 412, the data collection module 212 scrapes each document 132 to identify various portions of the documents 132, including descriptions of the software application and feedback units 120. The data collection module 212 may parse the documents 132 to identify tags (e.g., HTML tags or XML tags) that identify specific portions of the document 132.

At operation 414, the data collection module 212 creates a new application record 234 or updates a preexisting application record 234 based on the scraped data. As the data collection module 212 scrapes one or more documents 132 corresponding to the software application, the data collection module 212 may include the data scraped from the documents in an application record 234 corresponding to the software application. To the extent the software application is a newly discovered software application, the data collection module 212 creates a new application record 234 and populates the fields of the new application record 234 with the data scraped from the one or more documents 132. If the software application is a known software application, the data collection module 212 may update one or more fields of the application record 234 corresponding to the software application with the data scraped from the documents 132.

During the scraping, the data collection module 212 identifies different types of data, including feedback units 120. For instance, the data collection module 212 may parse the documents 132 for particular identifiers that connote the different types of data. With respect to feedback units 120, the data collection module 212 may parse the document 132 for feedback units 120 that are indicative of feedback units 120 (e.g., <div class="user review"> and <div class="star-rating">). When the data collection module 212 identifies a feedback unit 120, the data collection module 212 associates the feedback unit 120 with the software application by storing the feedback units 120 (or portions thereof) in the application record 234 of the software application. Furthermore, the data collection module 212 may determine whether the feedback unit 120 is a device-specific feedback unit 120, an OS-specific feedback unit 120, or a general feedback unit 120 (does not specify a device type or OS type). The data collection module 212 may read in the text contained after the identifier that identifies the feedback unit 120 and may parse the text to determine whether any known device types or OS types are contained in the text. Additionally or alternatively, the document 132 may contain metadata for each feedback unit 120 that identified the device type and/or OS type of the user device 100 that provided the feedback unit 120. In these situations, the data collection module 212 may determine the device type and/or OS type corresponding to the feedback unit 120 based on the metadata corresponding to the feedback unit 120. For the device-specific feedback units 120 and/or the OS-specific feedback units 120, the data collection module 212 may associate each of the device-specific feedback units 120 and/or the OS-specific feedback units 120 with the corresponding device type and/or OS type.

At operation 416, the data collection module 212 groups the feedback units 120 pertaining to the software application based on device type and/or OS type or version. In some implementations, the data collection module 212 groups the feedback units 120 contained in an application record 234 according to the device type or OS type defined in the feedback unit 120, whereby each group corresponds to a different device type or OS type. Furthermore, the data collection module 212 may identify an additional group that is not associated with any particular device type or OS type (i.e., device type-independent and OS-independent feedback units 120). The feedback units 120 in this group may not have references to a known device type or operating system (e.g., the feedback units contain generic reviews that do not indicate a name of a device type or a particular operating system).

At operation 418, the data collection module 212 updates one or more search indexes 254 based on the contents contained in the feedback units 120. For each group of feedback units 120, the data collection module 212 may determine keywords and combinations of keywords (e.g., 2-grams, 3-grams, and/or 4-grams) that are found in the text portions of the feedback units 120 (e.g., text of reviews 248) and may update the search indexes 254 according to the keywords and combinations of keywords. The data collection module 212 may also update the search indexes 254 based on keywords and combinations of keywords found in other textual portions of the application record 234 (e.g., the title and the description of the software application).

In implementations where a search index contains tags 258, the data collection module 212 may tag keyword/software application associations in the search index 254 based on the text contained in the feedback units 120 and the group to which the feedback units 120 belong. For each keyword or combination of keywords (e.g., an n-gram of keywords) contained in a feedback unit 120, the data collection module 212 determines whether the keyword or combination of keywords is contained in the search index 254. If not, the data collection module 212 adds the keyword or combination of keywords to the search index 254 and associates the software application (e.g., the application record 234 thereof) to the keyword or combination of keywords. If the keyword or combination of keywords is found in the search index 254, the data collection module 212 may associate the software application to the keyword or combination of keywords, provided that the association does not already exist in the search index 254. The data collection module 212 may then apply one or more tags 258 to the association. If the keyword or combination of keywords appears in a device-independent and OS-independent portion of an application record (e.g., in the description 242 or a general review 248-G), the data collection module 212 applies a general tag 258-G to the association. If the keyword or combination of keywords appears in a device specific feedback unit 120 (e.g., in a device specific review 248-D), the data collection module 212 applies a device-specific tag 258-D to the association, whereby the device-specific tag 258-D indicates the device type indicated in the device specific feedback unit 120. Similarly, if the keyword or combination of keywords appears in an OS-specific feedback unit 120 (e.g., an OS-specific review 248-O), the data collection module 212 applies an OS-specific tag 258-O to the association, whereby the OS-specific tag 258-O indicates the OS type or version indicated in the OS-specific feedback unit 120. The data collection module 212 may apply more than one tag 258 to a keyword or combination of keywords/software application association if the keyword or combination of keywords appears with respect to more than one device type or OS type, or if the keyword or combination of keywords appears in the device-independent and OS-independent potions of the application record 234 as well as one or more device-specific feedback units 120 and/or one or more OS-specific feedback units 120.

In some implementations, the data collection module 212 calculates an index score for each tag 258 applied to a keyword or combination of keywords/software application association. For example, the data collection module 212 may calculate the index score (e.g., TF-IDF score) corresponding to a general tag 258-G applied to a keyword 256 or combination of keywords 256/software application association based on the number of instances of the keyword 256 or combination of keywords 256 found in the device-independent and OS-independent portions of the application record 234 (e.g., in the description 242 and general ratings 248-G). The data collection module 212 may then attribute the index score to the general tag 258-G. Similarly, for a device-specific tag 258-D corresponding to a particular device type, the data collection module 212 may calculate the index score of the keyword 256 or combination of keywords/software application association based on the number of instances of the keyword 256 or combination of keywords 256 contained in any device-specific reviews 248-D corresponding to the particular device type as well as the device-independent and OS-independent portions of the application record 234 (e.g., in the description 242 and general reviews 248-G). For an OS-specific tag 258-O, the data collection module 212 may calculate the index score of the keyword 256 or combination of keywords/software application based on the number of instances of the keyword 256 or combination of keywords 256 contained in the OS-specific reviews 248 corresponding to the particular OS type or version as well as the device-independent and OS-independent portions of the application record 234 (e.g., in the description 242 and general reviews 248-G). The data collection module 212 may attribute the calculated index scores to their respective device-specific tag 258-D or OS-specific tag 258-O. The data collection module 212 calculates index scores for each general tag 258-G, device-specific tag 258-D, and/or OS-specific tag 258-O applied to the keyword/software application association.

In implementations where there the search system 200 includes one or more general indexes 252-G, as well as a plurality of device-specific search indexes 252-D and/or a plurality of OS-specific search indexes 252-O, the data collection module 212 may update the search indexes 252-G, 252-D, 252-O based on keywords and combinations of keywords contained in textual portions of the application record 234 corresponding to the software application. For each keyword or combination of keywords contained in a device-independent and OS-independent portion of the application record 234 (e.g., in the title 236, the description 242 and/or a general review 248-G), the data collection module 212 updates the general search index 252-G by associating the software application (e.g., the application record 234 of the software application) to the keyword or combination of keywords. Additionally, the data collection module 212 may calculate an index score (e.g., TD-IDF score) of the keyword or combination of keywords/software application association based on the number of instances of the keyword or combination of keywords in the device-independent and OS-independent portions of the application record 234 of the software application.

For each group of device-specific feedback units 120, the data collection module 212 may identify the keywords and combinations of keywords contained in the device-specific feedback units 120 pertaining to a particular device type. For each of the identified keywords or combination of keywords, the data collection module 212 may add the keyword or combination of keywords to a device-specific search index 252-D when the keyword or combination of keywords is not indicated in the device-specific search index 252-D of the particular device type. The data collection module 212 may associate the software application with the identified keyword or combination of keywords in the device-specific search index 252-D when the software application has not been previously associated with the keyword or combination of keywords in the device-specific search index 252-D. Additionally, the data collection module 212 may calculate an index score of the keyword or combination of keywords/software application association based on the number of instances of the keyword or combination of keywords contained in the device-specific reviews 248-D found in the group of device-specific feedback units 120 and the number of instances in the device-independent and OS-independent portions of the application record.

For each group of OS-specific feedback units 120, the data collection module 212 may identify the keywords and combinations of keywords contained in the OS-specific feedback units 120 pertaining to a particular OS-type. For each identified keyword or combination of keywords, the data collection module 212 may add the keyword or combination of keywords to an OS-specific search index 252-O when the keyword or combination of keywords is not indicated in the OS-specific search index 252-O of the particular OS-type. The data collection module 212 may associate the software application with the identified keyword or combination of keywords in the OS-specific search index 252-O when the software application has not been previously associated with the keyword or combination of keywords in the OS-specific search index 252-O. Additionally, the data collection module 212 may calculate an index score of the keyword or combination of keywords/software application association based on the number of instances of the keyword or combination of keywords contained in the OS-specific reviews 248-O found in the group of OS-specific feedback units 120 and the number of instances in the device-independent and OS-independent portions of the application record.

The method 400 of FIG. 4 is provided for example only and not intended to limit the scope of the disclosure. The method may include additional or alternate operations. For example, the data collection module 212 may be configured to extract text snippets 252 from the feedback units 120. In some implementations, the text snippets 252 are extracted from particular groups, whereby the text snippets 252 are device-specific text snippets 252-G and/or OS-specific text snippets 252-D. The data collection module 212 may include the text snippets 252 in the application record 234 of the software application.

Modules and data stores included in the search system 200 represent features that may be included in the search system 200 of the present disclosure. For example, the application search module 214 and the application data store 232 may represent features included in the search system 200. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein are realized by common electronic hardware and software components. In some implementations, the features associated with the one or more modules and data stores depicted herein are realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component may include any non-transitory computer readable medium (e.g., volatile or non-volatile media). For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the application data (e.g., application records) included in the application data store 232. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components are configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components include hardware and software that is configured to communicate with various human interface devices, including, but not limited to, display screens, keyboards, pointer devices (e.g., a mouse), touchscreens, speakers, and microphones. In some examples, the I/O components include hardware and software that is configured to communicate with additional devices, such as external memory (e.g., external HDDs).

In some implementations, the system 200 is a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the system 200 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the system 200 may be configured to communicate with the network. The one or more computing devices of the system 200 may also be configured to communicate with one another via a computer network. In some examples, the one or more computing devices of the system 200 include one or more server computing devices configured to communicate with user devices (e.g., receive queries and transmit search results), gather data from data sources 130, index data, store the data, and store other documents. The one or more computing devices reside within a single machine at a single geographic location in some examples. In other examples, the one or more computing devices may reside within multiple machines at a single geographic location. In still other examples, the one or more computing devices of the system 200 may be distributed across a number of geographic locations.

Figure 5:
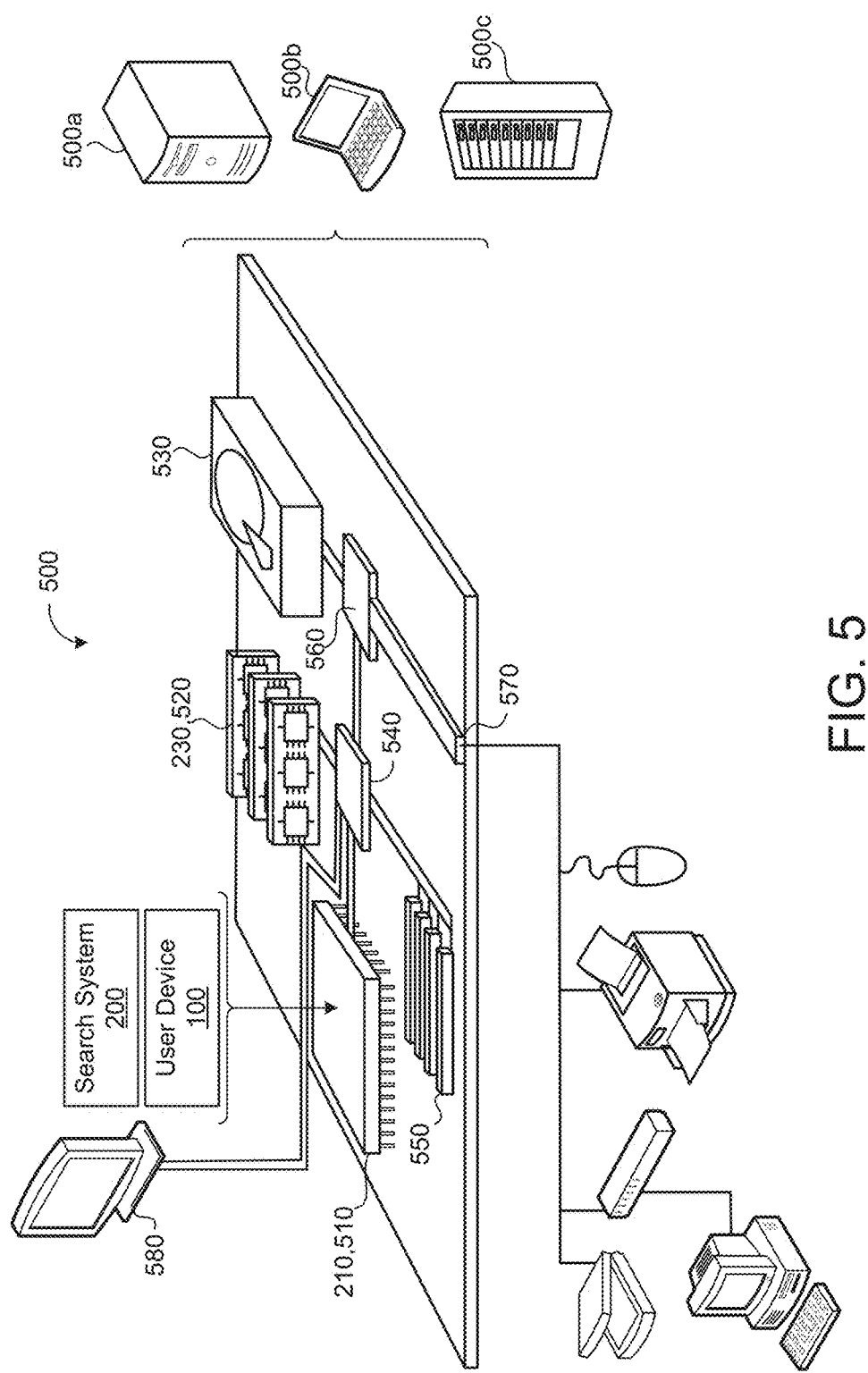
FIG. 5 is a schematic view of an example computing device executing any systems or methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to low speed bus 570 and storage device 530. Each of the components 510, 520, 530, 540, 550, and 560, are interconnected using various busses, and may be mounted on a common motherboard or in other manners as appropriate. The processor 510 may process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described here may be realized in digital electronic and/or optical circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification may be implemented in digital electronic circuitry, or in computer software, firmware, or hardware, including the structures disclosed in this specification and their structural equivalents, or in combinations of one or more of them. Moreover, subject matter described in this specification may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, one or more aspects of the disclosure may be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user may provide input to the computer. Other kinds of devices may be used to provide interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

One or more aspects of the disclosure may be implemented in a computing system that includes a backend component, e.g., as a data server, or that includes a middleware component, e.g., an application server, or that includes a frontend component, e.g., a client computer having a graphical user interface or a Web browser through which a user may interact with an implementation of the subject matter described in this specification, or any combination of one or more such backend, middleware, or frontend components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) may be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims may be performed in a different order and still achieve desirable results.

What is claimed is:

1. A method comprising:
   receiving, by one or more processors of a computing device, a search query and a device type identifier from a user device, the search query including one or more query terms and the device type identifier being indicative of a device type of the user device;
   obtaining, by the one or more processors, data associated with one or more software applications from one or more data sources;
   identifying, by one or more processors, a consideration set of application records based on the search query and the device type identifier, each application record of the consideration set corresponding to a the one of the one or more software applications and having an initial score associated therewith indicating a degree to which the application record matches the search query, wherein at least one of the application records includes a device-specific review corresponding to the device type of the user device that includes at least one keyword that matches to at least one of the query terms;
   for each application record, determining, by the one or more processors, a result score of the application record based on the initial score and features corresponding to the application record;
   generating, by the one or more processors, device-specific search results based on the consideration set of application records and the result scores thereof, the device-specific search results indicating at least one software application that is relevant to the search query; and
   transmitting, by the one or more processors, the device-specific search results including a graphical user interface element to the user device, wherein the device-specific search results include a graphical user interface element that allows the user device to download at least one native application corresponding to the at least one software application, and the graphical user interface element is included in the obtained data.

2. The method of claim 1, wherein identifying the consideration set comprises:
determining one or more tokens with which to query a search index based on the query terms, wherein the search index is keyed by a plurality of keywords, each keyword being associated with one or more application records that contain the keyword, and each association between the keyword and a particular application record of the one or more application records being tagged with a general tag and/or one or more device-specific tags, the general tag indicating that the keyword is found in a device-independent portion of the particular application record and each device-specific tag respectively corresponding to a known device type of a plurality of known device types and indicating that the keyword is found in a device-specific portion of the particular application record corresponding to the known device type;
for each token, querying the search index using the token and the device type identifier, and receiving, from the search index, application identifiers associated with the keyword represented by the token and tagged with at least one of a general tag or a device-specific tag corresponding to the device type identifier; and
adding the application identifiers in the consideration set, each application identifier added to the consideration set respectively indicating an application record of the consideration set.

3. The method of claim 2, wherein for each application record containing a device-specific portion corresponding to a particular device type, the device-specific portion is based on one or more device-specific reviews of the software application that indicate the particular device type.

4. The method of claim 3, wherein for each application record containing the device-specific portion corresponding to the particular device type, the device-specific portions are obtained from one or more scraped feedback units, each scraped feedback unit corresponding to the particular device type and including text that includes the device-specific review.

5. The method of claim 4, wherein the device-specific reviews of the software application identified in the application record are determined by:
obtaining, by the processing system, one or more documents relating to the software application from one or more data sources, at least one of the one or more documents including a plurality of feedback units corresponding to the software application, the feedback units each including text representing a review of the software application;
identifying, by the processing system, a subset of feedback units from the plurality of feedback units that pertain to the particular device type; and
for each feedback units in the subset of feedback units:
identifying, by the processing system, the text representing the review of the software application; and
associating, by the processing system, the text representing the review of the software application with the particular device type in the application record of the software application.

6. The method of claim 5, wherein a device-specific tag corresponding to the particular device type, when applied to an association between a keyword of the search index and the application record, indicates that the keyword is found in at least one device-specific review corresponding to the particular device type.

7. The method of claim 1, wherein identifying the consideration set comprises:
determining one or more tokens based on the query terms of the search query;
selecting a device-specific search index from a plurality of device-specific search indexes based on the device type identifier, the device-specific search index corresponding to the device type indicated by the device type identifier and being keyed by a first set of first keywords, each first keyword being associated with one or more application records that contain the first keyword in a device-specific portion of the one or more applications, the device-specific portions corresponding to the device type indicated by the device type identifier;
querying the device-specific search index with each of the one or more tokens, and receiving, from the device-specific search index, application identifiers of application records that match one or more of the tokens; and
adding the application identifiers to the consideration set, each application identifier added to the consideration set respectively indicating an application record of the consideration set.

8. The method of claim 7, wherein for each application record indexed in the device-specific search index corresponding to the device type indicated by the device type identifier, the device-specific portion is based on one or more device-specific reviews of the software application that indicate a make and a model.

9. The method of claim 8, wherein for each application record indexed in the device-specific search index, the device-specific portions are obtained from one or more scraped feedback units, each scraped feedback unit corresponding to the device type and including text that includes the device-specific review.

10. The method of claim 9, wherein the device-specific reviews of the software application identified in the application record are determined by:
obtaining, by the processing system, one or more documents relating to the software application from one or more data sources, at least one of the one or more documents including a plurality of feedback units corresponding to the software application, each feedback unit including text representing a review of the software application;
identifying, by the processing system, a subset of feedback units from the plurality of feedback units that pertain to the device type; and
for each feedback unit in the subset of feedback units:
identifying, by the processing system, the text representing the review of the software application; and
associating, by the processing system, the text representing the review of the software application with the device type in the application record of the software application.

11. The method of claim 7, wherein identifying the consideration set further comprises:
querying a general search index with each of the one or more tokens, the general search index being keyed by a second set of second keywords, each second keyword being associated with one or more application records that contain the second keyword in a device-independent portion of the application record;

receiving, from the general search index, application identifiers of application records that match to one or more of the tokens; and adding the application identifiers to the consideration set, each application identifier added to the consideration set respectively indicating an application record of the consideration set.

12. A search system comprising:
a memory and
one or more wherein the memory stores instructions executed to enable the one or more processors to:
  receive a search query and a device type identifier from a user device, the search query including one or more query terms and the device type identifier being indicative of a deice type of the user device,
  obtain data associated with one or more software applications from one or more data sources,
  identify a consideration set of application records based on the search query and the device type identifier, each application record of the consideration set corresponding to one of the one or more software applications and having an initial score associated therewith indicating a degree to which the application record matches the search query, wherein at least one of the application records includes a device-specific review corresponding to the device type of the user device that includes at least one keyword that matches to at least one of the query terms,
  for each application record, determine a result score of the application record based on the initial score and features corresponding to the application record,
  generate device-specific search results based on the consideration set of application records and the result scores thereof, the device-specific search results indicating at least one software application that is relevant to the search query, and
  transmit the device-specific search results including a graphical user interface element to the user device,
  wherein the device-specific search results include a graphical user interface element that allows the user device to download at least one native application corresponding to the at least one software application, and the graphical user interface element is included in the obtained data.

13. The search system of claim 12, wherein the instructions executed to enable the one or more processors to:
  determine one or more tokens with which to query a search index based on the search query, wherein the search index is keyed by a plurality of keywords, each keyword being associated with one or more application records that contain the keyword, and each association between the keyword and a particular application record of the one or more application records being tagged with a general tag and/or one or more device-specific tags, the general tag indicating that the keyword is found in a device-independent portion of the particular application record and each device-specific tag respectively corresponding to a known device type of a plurality of known device types and indicating that the keyword is found in a device-specific portion of the particular application record corresponding to the known device type;
  for each token, query the search index using the token and the device type identifier, and receiving, from the search index, application identifiers associated with the keyword represented by the token and tagged with at least one of a general tag or a device-specific tag corresponding to the device type identifier; and
  add the application identifiers in the consideration set, each application identifier added to the consideration set respectively indicating an application record of the consideration set.

14. The search system of claim 12, wherein for each application record containing a device-specific portion corresponding to a particular device type, the device-specific portion is based on one or more device-specific reviews of the software application that indicate the particular device type.

15. The search system of claim 14, wherein for each application record containing the device-specific portion corresponding to the particular device type, the device-specific portions are obtained from one or more scraped feedback units, each scraped feedback unit corresponding to the particular device type and including text that includes the device-specific review.

16. The search system of claim 15, wherein the device-specific reviews of the software application identified in the application record is determined by:
  obtaining one or more documents relating to the software application from one or more data sources, at least one of the one or more documents including a plurality of feedback units corresponding to the software application, the feedback units each including text representing a review of the software application;
  identifying a subset of feedback units from the plurality of feedback units that pertain to the particular device type; and
  for each feedback units in the subset of feedback units:
    identifying the text representing the review of the software application; and
    associating the text representing the review of the software application with the particular device type in the application record of the software application.

17. The search system of claim 16, wherein a device-specific tag corresponding to the particular device type, when applied to an association between a keyword of the search index and the application record, indicates that the keyword is found in at least one device-specific review corresponding to the particular device type.

18. A search system comprising:
a memory; and
one or more processors, wherein the memory stores instructions executed to enable the one or more processors to:
  receive a search query and a device type identifier from the user device, the search query including one or more query terms and the device type identifier being indicative of a make and model of the user device,
  obtain data associated with one or more software applications from one or more data sources,
  select a device-specific search index from a plurality of device-specific search indexes based on the device type identifier, each of the plurality of device specific search indexes corresponding to a different make and model of a user device and corresponding to a respective set of first keywords;
  identify a consideration set of application records based on the search query, the selected device-specific search index, and a general search index, the general search index corresponding to a respective set of second keywords, for each application record, determine a result score of the application record based on features corresponding to the application record, generate device-specific search results based on the consideration set of application records and the result scores thereof, the device-specific search results indicating at least one software application that is relevant to the search query, and transmit the device-specific search results including a graphical user interface element to the user device, wherein the device-specific search results includes a graphical user interface elements that allows that user device to download at least one native application corresponding to the at least one software application, and the graphical user interface element is included in the obtained data.

19. The search system of claim 18, wherein for each application record indexed in the selected device-specific search index, the device-specific search index is selected based on one or more device-specific reviews of the software application that indicate the make and model indicated by the device type identifier.

20. The search system of claim 19, wherein for each application record indexed in the selected device-specific search index, the device-specific search index is selected from one or more scraped feedback units, each scraped feedback unit corresponding to the make and model indicated by the device identifier and including text that includes the device-specific review.

21. The search system of claim 20, wherein the obtained data includes a plurality of feedback units corresponding to the one or more software applications, the feedback units each including text representing a review of the software application, and wherein the device-specific reviews of the software application identified in the application by identifying a subset of feedback units from the plurality of feedback units that pertain to the make and model; and for each feedback units in the subset of feedback units:
identifying the text representing the review of the software application; and
associating the text representing the review of the software application with the make and model in the application record of the software application.

22. The search system of claim 18, wherein identifying the consideration set comprises:

determining one or more tokens based on the query terms of the search query;

querying the device-specific search index with each of the one or more tokens, and receiving, from the device-specific search index, application identifiers of application records that match one or more of the tokens; and adding the application identifiers to the consideration set, each application identifier added to the consideration set respectively indicating an application record of the consideration set.

23. The search system of claim 22, wherein identifying the consideration set comprises:

querying the general search index with each of the one or more tokens, and receiving, from the general search index, application identifiers of application records that match to one or more of the tokens; and adding the application identifiers to the consideration set, each application identifier added to the consideration set respectively indicating an application record of the consideration set.

* * * * *